US012776323B2

(12) United States Patent
Rikhye et al.

(10) Patent No.: US 12,776,323 B2
(45) **Date of Patent: *Oct. 27, 2026**

(54) VOICE SHORTCUT DETECTION WITH SPEAKER VERIFICATION

(71) Applicant: GOOGLE LLC, Mountain View, CA (US)

(72) Inventors: Rajeev Rikhye, Freemont, CA (US); Quan Wang, Hoboken, NJ (US); Yanzhang He, Palo Alto, CA (US); Qiao Liang, Redwood City, CA (US); Ian C. McGraw, Menlo Park, CA (US)

(73) Assignee: GOOGLE LLC, Mountain View, CA (US)

( * ) Notice: Subject to any disclaimer, the term of this patent is extended or adjusted under 35 U.S.C. 154(b) by 80 days.

This patent is subject to a terminal disclaimer.

(21) Appl. No.: 18/765,108

(22) Filed: Jul. 5, 2024

(65) Prior Publication Data

US 2024/0363122 A1 Oct. 31, 2024

Related U.S. Application Data

(63) Continuation of application No. 18/103,324, filed on Jan. 30, 2023, now Pat. No. 12,033,641, which is a (Continued)

(51) Int. Cl.

| | |
|---|---|
| ***G10L 17/24*** | (2013.01) |
| ***G10L 15/26*** | (2006.01) |

(Continued)

(52) U.S. Cl.

CPC .............. *G10L 17/24* (2013.01); *G10L 15/26* (2013.01); *G10L 17/06* (2013.01); *G10L 21/028* (2013.01)

(58) Field of Classification Search

CPC ........ G10L 17/06; G10L 17/24; G10L 21/028

See application file for complete search history.

(56) References Cited

U.S. PATENT DOCUMENTS

| | | | |
|---|---|---|---|
| 10,497,364 | B2 | 12/2019 | Lopez Moreno et al. |
| 11,568,878 | B2 | 1/2023 | Rikhye |

(Continued)

FOREIGN PATENT DOCUMENTS

| | | |
|---|---|---|
| CN | 110268469 | 9/2019 |
| CN | 110709924 | 1/2020 |

(Continued)

OTHER PUBLICATIONS

Snyder, David et al.; Deep Neural Network-based Speaker Embeddings for End-to-end Speaker Verification; IEEE Spoken Language Technology Workshop (SLT); 6 pages; dated 2016.

(Continued)

*Primary Examiner* — Shaun Roberts
(74) *Attorney, Agent, or Firm* — Gray Ice Higdon

(57) ABSTRACT

Techniques disclosed herein are directed towards streaming keyphrase detection which can be customized to detect one or more particular keyphrases, without requiring retraining of any model(s) for those particular keyphrase(s). Many implementations include processing audio data using a speaker separation model to generate separated audio data which isolates an utterance spoken by a human speaker from one or more additional sounds not spoken by the human speaker, and processing the separated audio data using a text independent speaker identification model to determine whether a verified and/or registered user spoke a spoken utterance captured in the audio data. Various implementations include processing the audio data and/or the separated audio data using an automatic speech recognition model to generate a text representation of the utterance. Additionally or alternatively, the text representation of the utterance can (Continued)

be processed to determine whether at least a portion of the text representation of the utterance captures a particular keyphrase. When the system determines the registered and/or verified user spoke the utterance and the system determines the text representation of the utterance captures the particular keyphrase, the system can cause a computing device to perform one or more actions corresponding to the particular keyphrase.

20 Claims, 9 Drawing Sheets

Related U.S. Application Data continuation of application No. 17/233,253, filed on Apr. 16, 2021, now Pat. No. 11,568,878.

(51) Int. Cl.

*G10L 17/06* (2013.01)
*G10L 21/028* (2013.01)

(56) References Cited

U.S. PATENT DOCUMENTS

| | | | |
|---|---|---|---|
| 2003/0069727 | A1 | 4/2003 | Krasny et al. |
| 2017/0178624 | A1 | 6/2017 | Friedland et al. |
| 2019/0043507 | A1 | 2/2019 | Huang et al. |
| 2019/0221206 | A1 | 7/2019 | Chen |
| 2019/0318725 | A1 | 10/2019 | Le Roux et al. |
| 2019/0318757 | A1 | 10/2019 | Chen et al. |
| 2020/0135209 | A1 | 4/2020 | Delfarah et al. |
| 2020/0160861 | A1 | 5/2020 | Lee |
| 2020/0211571 | A1 | 7/2020 | Shoa et al. |
| 2020/0411018 | A1 | 12/2020 | Chakravarty et al. |
| 2021/0082438 | A1 | 3/2021 | Zhao et al. |
| 2021/0110813 | A1 | 4/2021 | Khoury et al. |
| 2021/0272571 | A1 | 9/2021 | Balasubramaniam et al. |
| 2021/0343294 | A1 | 11/2021 | Wintrode |
| 2021/0390970 | A1 | 12/2021 | Zhang |
| 2022/0335953 | A1 | 10/2022 | Rikhye |
| 2023/0169984 | A1 | 6/2023 | Rikhye |

FOREIGN PATENT DOCUMENTS

| | | |
|---|---|---|
| CN | 111566729 | 8/2020 |
| CN | 112262431 X | 1/2021 |

OTHER PUBLICATIONS

European Patent Office; Intention to Grant issued in Application No. 21847832.9; 68 pages; dated Oct. 20, 2023.
Wang et al., "VoiceFilter: Targeted Voice Separation by Speaker-Conditioned Spectrogram Masking" arXiv:1810.04826v6 [eess.AS] dated Jun. 19, 2019. 5 pages.
Wang et al., "VoiceFilter-Lite: Streaming Targeted Voice Separation for On-Device Speech Recognition" arXiv:2009.04323v1 [eess.AS] dated Sep. 9, 2020. 5 pages.
Chen, G. et al., "Small-Footprint Keyword Spotting Using Deep Neural Networks." 2014 IEEE International Conference on Acoustic, Speech and Signal Processing (ICASSP); 5 pages; 2014.
Alvarez, R. et al., "End-to-End Streaming Keyword Spotting;" ICASSP 2019—2019 IEEE International Conference on Acoustics, Speech and Signal Processing (ICASSP); pp. 6336-6340; 2019.
Wan, L. et al., "Generalized end-to-end loss for speaker verification," in Acoustics, Speech and Signal Processing (ICASSP); IEEE; 5 pages; 2018.
Prabhavalkar, R. et al., "Automatic Gain Control and Multi-Style Training for Robust Small-Footprint Keyword Spotting with Deep Neural Networks;" in Proceedings of International Conference on Acoustics, Speech and Signal Processing (ICASSP); pp. 4704-4708; 2015.
He, Y. et al., "Streaming End-to-End Speech Recognition for Mobile Devices;" 2019 International Conference on Acoustics, Speech and Signal Processing (ICASSP); 5 pages; May 12, 2019.
Pinsky, Y., "Tomato, tomahto. Google Home now supports multiple users;" Blog; Google Assistant—Google Home; retrieved from the internet https://www.blog.google/products/assistant/tomato-tomahto-google-home-now-supports-multiple-users/; 3 pages; Apr. 20, 2017.
Nagrani, A. et al., "Voxceleb: a large-scale speaker identification dataset," arXiv preprint arXiv:1706.08612; 5 pages; 2017.
Ko, T. et al. "A study on data augmentation of reverberant speech for robust speech recognition," in 2017 IEEE International Conference on Acoustics, Speech and Signal Processing (ICASSP); IEEE; pp. 5220-5224; 2017.
Hershey, J. et al., "Deep clustering: Discriminative embeddings for segmentation and separation," in Acoustics, Speech and Signal Processing (ICASSP), 2016 IEEE International Conference; pp. 31-35; 2016.
Kolbæk, M. et al., "Multitalker speech separation with utterance-level permutation invariant training of deep recurrent neural networks," IEEE/ACM Transactions on Audio, Speech and Language Processing (TASLP), vol. 25, No. 10, pp. 1901-1913, 2017.
Kumatani, K. et al., "Direct Modeling of Raw Audio with DNNS for Wake Word Detection;" in IEEE Automatic Speech Recognition and Understanding Workshop (ASRU); 6 pages; Dec. 2017 Dec. 2017.
Shan, C. et al., "Attention-based End-to-End Models for Small-Footprint Keyword Spotting;" ArXiv.org; arXiv:1803.10916v1; 5 pages; 2018.
He, Y. et al., "Streaming Small-Footprint Keyword Spotting Using Sequence-To-Sequence Models," in IEEE Automatic Speech Recognition and Understanding Workshop (ASRU); pp. 474-481; Dec. 2017.
Simpson, A. et al., "Deep Karaoke: Extracting Vocals from Musical Mixtures Using a Convolutional Deep Neural Network," arXiv.org; arXiv:1504.04658; 5 pages; Apr. 17, 2021.
Nachmani, E. et al., "Voice Separation with an Unknown Number of Multiple Speakers," in International Conference on Machine Learning; 12 pages; 2020.
McDermott, J.H., "The cocktail party problem;" Current Biology, vol. 19, No. 22, pp. R1024-R1027; 2009.
Pressnitzer, D. et al., "Perceptual Organization of Sound Begins in the Auditory Periphery;" Current Biology, vol. 18, No. 15; pp. 1124-1128; Aug. 5, 2008.
Wang, Q. et al., "VoiceFilter-Lite: Streaming Targeted Voice Separation for On-Device Speech Recognition;" in Interspeech 2020; 5 pages; Oct. 2020.
Sainath, T. et al., "A Streaming On-Device End-To-End Model Surpassing Server-Side Conventional Model Quality and Latency," in International Conference on Acoustics, Speech and Signal Processing (ICASSP) IEEE; pp. 6059-6063; May 2020.
Zhu, M. et al. "To Prune, or Not to Prune: Exploring the Efficacy of Pruning for Model Compression;" in ICLR workshop; 10 pages; Feb. 2018.
Huang, Y. et al., "Hotword Cleaner: Dual-Microphone Adaptive Noise Cancellation with Deferred Filter Coefficients for Robust Keyword Spotting;" in International Conference on Acoustics, Speech and Signal Processing (ICASSP) IEEE; 5 pages; May 2019.
Jensen, N.; "More ways to fine tune Google Assistant for you;" Google Assistant Blog; retrieved from internet: https://blog.google/products/assistant/more-ways-fine-tune-google-assistant-you/; 5 pages; Apr. 23, 2020.
Wang, Q. et al., "Version Control of Speaker Recognition Systems;" arXiv.org; arXiv:2007.12069v2; 7 pages; Jul. 26, 2020.
Graves, A., "Sequence Transduction with Recurrent Neural Networks;" arXiv.org; arXiv:1211.3711v1; 9 pages; Nov. 14, 2012.
Greff, K. et al., "LSTM: A Search Space Odyssey," IEEE Transactions on Neural Networks and Learning Systems, vol. 28, No. 10; pp. 2222-2232; 2017.
Shangguan, Y. et al., "Optimizing Speech Recognition for the Edge;" in Conference on Machine Learning and Systems (MLSys); 7 pages; 2020.

(56) References Cited

OTHER PUBLICATIONS

Narayanan, A. et al., "Recognizing Long-Form Speech Using Streaming End-To-End Models," in IEEE Automatic Speech Recognition and Understanding Workshop (ASRU); pp. 920-927; dated 2019.
Chung, J.S. et al., "Voxceleb2: Deep Speaker Recognition;" arXiv.org; arXiv:1806.05622v2; 6 pages; Jun. 27, 2018.
Fan, Y. et al., "CN-CELEB: A Challenging Chinese Speaker Recognition Dataset," in IEEE International Conference on Acoustics, Speech and Signal Processing (ICASSP); pp. 7604-7608; 2020.
Garofolo, J.S. et al., "DARPA TIMIT Acoustic-Phonetic Continuous Speech Corpus CD-ROM. NIST Speech Disc 1-1.1," NASA STI/Recon technical report n, vol. 93; 94 pages; 1993.
Baumann, T. et al., "The Spoken Wikipedia Corpus Collection: Harvesting, Alignment and an Application to Hyperlistening," Language Resources and Evaluation, vol. 53; 28 pages; 2019.
Pham, M. et al., "Toward Better Speaker Embeddings: Automated Collection of Speech Samples from Unknown Distinct Speakers," in IEEE International Conference on Acoustics, Speech and Signal Processing (ICASSP); 5 pages; May 2020.
Lippmann, R. et al., "Multi-Style Training for Robust Isolated-Word Speech Recognition," in IEEE International Conference on Acoustics, Speech, and Signal Processing (ICASSP), vol. 12; pp. 705-708; 1987.
Rao, W. et al., "Target Speaker Extraction for Multi-Talker Speaker Verification," in Proceedings of Interspeech; 5 pages; Sep. 2019.
Wang, Q. et al., "Voice-Filter: Targeted Voice Separation by Speaker-Conditioned Spectrogram Masking," in Proceedings of Interspeech; pp. 2728-2732; Sep. 2019.
Widrow, B. et al., "Adaptive Noise Cancelling: Principles and Applications," Proceedings of the IEEE, vol. 63, No. 12, pp. 1692-1716; Dec. 1975.
Shen, J. et al., "Natural TTS Synthesis by Conditioning WaveNet on MEL Spectrogram Predictions," in IEEE International Conference on Acoustics, Speech and Signal Processing (ICASSP); pp. 4779-4783; 2018.
Kim C. et al., "Generation of Large-Scale Simulated Utterances in Virtual Rooms to Train Deep-Neural Networks for Far-Field Speech Recognition in Google Home;" in Proceedings of Interspeech; 5 pages; Aug. 2017 Aug. 2017.
European Patent Office; International Search Report and Written Opinion issued in PCT/US2021/064138; 12 pages; dated Apr. 12, 2022.
Rikhye R. et al.; Personalized Keyphrase Detection Using Speaker and Environment Information; 5 pages; dated Jul. 15, 2021.
Rikhye R. et al.; Multi-user voicefilter-lite via attentive speaker embedding; arXiv preprint arXiv:2017,01201; dated 2021.
Jia et al.; The 2020 Personalized Voice Trigger Challenge: Open Database Evaluation Metrics and the Baseline Systems; 6 pages; dated Jan. 6, 2021.
Wang et al.; VoiceFilter-Lite: Streaming Targeted Voice Separation for On-Device Speech Recognition; 5 pages; dated Sep. 9, 2020.
China Intellectual Property Office, First Office Action issued in Application No. 202180089331, 12 pages, dated Jul. 23, 2026.

VOICE SHORTCUT DETECTION WITH SPEAKER VERIFICATION

BACKGROUND

An automated assistant (also known as a "personal assistant", "mobile assistant", etc.) may be interacted with by a user via a variety of client devices such as smart phones, tablet computers, wearable devices, automobile systems, standalone personal assistant devices, and so forth. An automated assistant receives input from the user including spoken natural language input (i.e., utterances) and may respond by performing an action, by controlling another device and/or providing responsive content (e.g., visual and/or audible natural language output). An automated assistant interacted with via a client device may be implemented via the client device itself and/or via one or more remote computing devices that are in network communication with the client device (e.g., computing device(s) in the cloud).

Some user interface inputs that can invoke an automated assistant via a client device include a hardware and/or virtual button at the client device for invoking the automated assistant (e.g., a tap of a hardware button, a selection of a graphical interface element displayed by the client device). Many automated assistants can additionally or alternatively be invoked in response to one or more spoken general invocation phrases, which are also known as "hot words/phrases", "trigger words/phrases", or "keywords/phrases". For example, a spoken invocation phrase such as "Hey Assistant," "OK Assistant", and/or "Assistant" can be spoken to invoke an automated assistant.

Keyword spotting models (e.g., wake word detection models) can be used to initiate human-machine conversation. For example, a user can initiate a human-machine conversation by saying the keyphrase "OK Assistant", "Hey Assistant", "Assistant", etc. Conventional keyword spotting models are trained to recognize a single predefined phrase or a few predefined phrases. Additionally or alternatively, conventional keyword spotting models often assume the keyword is covered by a fixed-length window of audio. Support of a new keyphrase typically requires retraining the entire keyword spotting model.

SUMMARY

Techniques disclosed herein are directed toward streaming keyphrase detection which can be customized to detect one or more particular keyphrases, without requiring retraining of any model(s) for those particular keyphrase(s). In some implementations, one or more of the particular keyphrase(s) can be customized to a user of a computing system. For example, a user can turn off one or more smart lights, using an automated assistant client, by speaking a customized keyphrase "turn off the lights" to the automated assistant, where "turn off the lights" is a particular keyphrase customized for the user and maps to one or more assistant commands which turn off the one or more smart lights. For example, the particular keyphrase can map directly to the assistant command(s), enabling bypassing of natural language understanding (NLU) processing and more efficient and lower latency performance of the assistant command(s) in response to detection of the particular keyphrase.

In contrast, conventional keyphrase detection would require the user to first speak a predefined general invocation keyphrase, for example, "OK Assistant" prior to speaking the command "turn off the lights" and would require NLU processing and/or further processing in determining assistant command(s) that correspond to turn off the light(s). Additionally or alternatively, conventional keyphrase detection models are prone to false triggering (e.g., triggering the automated assistant client in response to a spoken utterance that is not a keyphrase and/or non-speech noise) and/or prone to false rejections (e.g., failing to trigger the automated assistant client in response to a spoken utterance that contains a keyphrase).

In some implementations, streaming keyphrase detection techniques disclosed herein can mitigate false triggering and/or false rejections. Additionally or alternatively, streaming keyphrase detection techniques disclosed herein can be customized to trigger the automated assistant client based on one or more additional keyphrases not included in the training of the keyphrase detection system, without the need to retrain the entire system.

In some implementations, a streaming keyphrase detection system can include a speaker separation model, a text independent speaker identification (TI-SID) model, an automatic speech recognition (ASR) model, a keyphrase matching model, an adaptive noise cancellation model, and/or one or more additional or alternative models and/or components. For example, audio data can capture Scott speaking the utterance "Coffee maker, start brewing coffee" as well as a baby crying. The audio data and a speaker embedding corresponding to Scott can be processed using a speaker separation model to generate separated audio data, where the separated audio data isolates the spoken utterance. In other words, the separated audio data captures Scott speaking the utterance "Coffee maker, start brewing coffee" without the baby crying.

The separated audio data and the speaker embedding corresponding to Scott can be processed using a TI-SID model to generate speaker verification output, where the speaker verification output can confirm the utterance was spoken by a registered and/or verified user. In some implementations, the system can process the audio data and/or the separated audio data using an ASR model to generate a text representation of the utterance. For instance, the system can process the audio data capturing the utterance "Coffee maker, start brewing coffee" and the baby crying and/or the separated audio data capturing the utterance "Coffee maker, start brewing coffee" using the ASR model to generate a text representation of "Coffee maker, start brewing coffee". The system can determine whether the text representation of the spoken utterance is a particular keyphrase, from a plurality of keyphrases associated with the user. For example, the system can determine whether the text representation of the utterance "Coffee maker, start brewing coffee" is a particular keyphrase corresponding to Scott.

In some implementations, the system can compare the text representation of the utterance with a text representation of each of the plurality of keyphrases corresponding to the user. In some other implementations, the text representation of the spoken utterance can be processed using a keyphrase matching model to generate keyphrase verification output, where the keyphrase verification output indicates whether the text representation of the utterance contains a particular keyphrase of the plurality of keyphrases. Continuing with the example, if the system determines the text representation of "Coffee maker, start brewing coffee" matches a particular keyphrase, the system can determine one or more actions corresponding to the keyphrase (e.g., turn on a smart coffee maker and cause the smart coffee maker to being brewing coffee). In some implementations, the one or more actions can be directly mapped to the particular keyphrase (e.g., identification of one or more actions corresponding to each particular keyphrase is stored locally at the computing device). In some other implementations, the text representation can be processed using a NLU model to determine the intent of the utterance. One or more actions corresponding to the utterance can be determined based on the determined intent. In some implementations, the system can initiate performance of the actions mapped to the particular keyphrase, such as turning on the smart coffee maker and causing the smart coffee maker to begin brewing coffee.

In some implementations, a speaker separation model can be used to mitigate false rejection(s) by separating the speech of a target speaker (e.g., a known user of the computing system) from one or more one or more noises not spoken by the target speaker. For example, the system can process audio data capturing an utterance spoken by a target user of "turn on the living room lights" and one or more sounds that are not spoken by the target user (e.g., a barking dog, audio from a television, a spoken utterance spoken by an additional user, one or more additional or alternative sounds, and/or combinations thereof) to generate separated audio data. The generated separated audio data can omit (or at least suppress) some or all of the noise(s), of the audio data, that are not spoken by the target speaker. In some implementations, the speaker separation model can be a voice filter model.

A voice filter model can isolate a human voice from a waveform representation of an audio signal, a frequency representation of an audio signal, and/or a model produced representation of an audio signal by generating, using the voice filter model, a predicted mask and/or predicted enhanced representations of the audio data. In some implementations, processing the representation of the audio signal with the predicted mask can isolate portion(s) of the representation of the audio signal corresponding to the human voice. For example, processing the frequency representation with the predicted mask can isolate portion(s) of the frequency representation corresponding to the human voice. The revised frequency representation generated by processing the frequency representation using the predicted mask can be processed using an ASR model to, for example, generate a text representation (e.g., text, a symbolic representation of text, etc.) of utterance(s) spoken by the isolated human voice. In other words, a voice filter model can be used in processing acoustic features (e.g., the frequency representation) and generating revised acoustic features (e.g., the revised frequency representation) that isolate portion(s) of the acoustic features corresponding to utterance(s) of a single human for use in speech processing without reconstruction of the audio signal(s) from the features.

For example, assume a sequence of audio data that includes first utterance(s) from a first human speaker, second utterance(s) from a second human speaker, and various occurrences of background noise. Implementations disclosed herein can utilize a frequency representation of the sequence of audio data to generate a revised frequency representation that includes portion(s) corresponding to the utterance(s) from the first human speaker, and excludes portion(s) corresponding to the second utterance(s) and the background noise, where the revised frequency representation can be further utilized without reconstruction of an additional audio signal corresponding to the revised frequency representation.

The voice filter model can be used to process a speaker embedding corresponding to the human speaker in addition to the frequency representation of the audio data to generate the predicted mask. For instance, a speaker embedding corresponding to the first human speaker can be processed in addition to the sequence of audio data to generate a predicted mask which can be utilized to isolate utterance(s) of the first human speaker. In many implementations, a speaker embedding can be generated prior to processing the sequence of audio data during an enrollment process (i.e., a pre-generated speaker embedding). The sequence of audio data can be associated with the pre-generated speaker embedding after verification of the first human speaker (e.g., using voice fingerprinting and/or other biometric verification(s)). Utilizing a pre-generated speaker embedding can enable real-time automatic speech processing of the sequence of audio data.

In some implementations, a client device can be associated with multiple users (e.g., the client device has multiple registered users). In some implementations, the system can process the audio data using a separate instance of the speaker separation model and a speaker embedding corresponding to each registered user. However, this can be impractical in some situations. In some other implementations, the speaker separation model can be a multi-user voice filter model which can be used in generating a predicted mask based on multiple speaker embeddings, each of which correspond to a registered user of the client device. In some implementations, the audio data can be processed using an additional attention network (e.g., a PreNet model) to generate a key vector with the same dimension as the speaker embedding(s). An attended weight can be generated for each speaker embedding. In some of those implementations, an attended embedding can be generated based on each of the speaker embeddings and the corresponding attended weights for each of the speaker embeddings. The attended embedding can be used by a voice filter model to generate the predicted mask in place of the speaker embedding. In other words, the voice filter model can generate a predicted mask based on a frequency representation of the audio data and the attended embedding, where the attended embedding is based on a speaker embedding of each user registered with a client device and an attended weight corresponding to each of the speaker embeddings.

In some implementations, false triggering can be mitigated by processing audio data (e.g., separated audio data generated by processing audio data using a speaker separation model) using a text independent speaker identification (TI-SID) model to generate speaker verification output. Speaker verification output can provide an indication of whether a target speaker spoke a spoken utterance. For example, speaker verification output can provide an indication of whether a registered user of a system spoke a spoken utterance.

Text independent (TI) speaker identification can be based on processing of audio data that captures a spoken utterance (e.g., separated audio data). In such examples, the other devices may only be caused to be controlled responsive to verifying that a particular authorized user spoke the particular spoken utterance. Speaker identification can be used, with permission of a user, to verify that the user spoke a particular spoken utterance. Responsive to verifying that the user spoke the particular spoken utterance, content can be provided responsive to the particular spoken utterance, where that content is both responsive to the particular spoken utterance and is customized for the user. Speaker identification can include processing, using a speaker identification model, audio data that captures the spoken utterance to generate output, and comparing that output with a speaker embedding for the user (e.g., an embedding associated with a user profile of the user). For example, if a distance metric between the generated output and the speaker embedding for the user satisfies a threshold, the user can be verified as the user that spoke the particular spoken utterance. The speaker embedding for the user can be generated based on output(s) generated based on processing of one or more instances of audio data that includes spoken utterances that are from the user. For example, the speaker embedding can be based on an average (or other combination) of a plurality of different embeddings that are each generated based on processing of a corresponding instance of audio data that includes a corresponding spoken utterance from the user.

In text dependent (TD) speaker identification, the speaker embedding of a user is generated based on spoken utterances that include only one or more specific words and/or one or more specific phrases. Moreover, in use, the user must speak the one or more specific words/phrases for output to be generated, using a TD speaker identification model that sufficiently matches the speaker embedding. As one example, the one or more specific words/phrases in TD speaker identification can be constrained to one or more invocation phrases configured to invoke an automated assistant. An invocation phrase for an automated assistant contains one or more hot words/trigger words such as, for example, "Hey Assistant", "OK Assistant", and/or "Assistant".

In contrast, in TI speaker identification, the spoken utterance processed using a TI-SID model is not constrained to specific word(s) and/or specific phrase(s). In other words, audio data based on virtually any spoken utterance can be processed using a TI-SID model to generate output which can be effectively compared to a TI speaker embedding for a particular user to determine whether the spoken utterances are from the particular user. Moreover, in various implementations the speaker embedding of a user utilized in TI speaker identification is generated based on spoken utterances that include disparate words and/or phrases.

In some implementations, an automatic speaker recognition (ASR) model can be used to process the audio data and/or the separated audio data (e.g., generated by processing the audio data using a speaker separation model) to generate a text representation of the spoken utterance captured in the audio data. In some implementations, the ASR model can be an on device and/or streaming ASR model. For example, the system can use a variety of ASR models trained to generate a text representation of a spoken utterance including a deep neural network, a recurrent neural network (RNN), a long short-term memory (LSTM) network, a convolutional neural network, one or more additional networks, and/or combinations thereof. For example, the system can use a recurrent neural network transducer (RNN-T) model for generating a text representation of a spoken utterance. In some implementations, the system can use an existing ASR model, such as a local on-device ASR model stored locally at a client device for generating the text representation of the spoken utterance. The use of an existing ASR model can enable the keyphrase detection system to be triggered by any of a variety of keyphrases as long as the word(s) in the keyphrase can be identified using the ASR model.

In some implementations, the system can determine whether the text representation of the spoken utterance (e.g., the text representation generated by processing the audio data and/or the separated audio data using the ASR model) corresponds to a particular keyphrase of a plurality of keyphrases associated with the user. For example, the system can process the text representation of the spoken utterance using a keyphrase matching model to determine whether the text representation of the spoken utterance corresponds with a keyphrase associated with the user. In some implementations, the plurality of keyphrases associated with a user can include one or more personalized keyphrases for the user. For example, a personalized keyphrase of "turn off the second garage light" can be generated by the user to control a specific smart light in their house. Additionally or alternatively, the plurality of keyphrases can include one or more particular keyphrases associated with a third party. For example, a particular keyphrase can initiate one or more actions of a third party application via the automated assistant client. For instance, a particular keyphrase of "Hey Hypothetical Café, I want to order a large coffee" can be used to order a large coffee from the restaurant Hypothetical Café.

Furthermore, in some implementations, the false rejection rate can be reduced by processing the audio data using an adaptive noise cancellation model. Adaptive noise cancellation techniques can be used for selectively adapting and/or selectively utilizing a noise reduction technique in detection of one or more features of a stream of audio data frames. For example, various techniques are directed to selectively adapting and/or utilizing a noise reduction technique in detection of a key phrase in a stream of audio data frames, detection of voice characteristics in a stream of audio data frames (e.g., for speaker identification), etc. Utilization of such techniques can result in more robust and/or more accurate detections of features of a stream of audio data frames in various situations, such as in environments with strong background noise. In various implementations, adaptive noise cancellation techniques may be implemented in combination with an automated assistant, and feature(s) detected utilizing various techniques can be utilized to adapt the functionality of the automated assistant. For example, when techniques are utilized to detect presence of an invocation phrase in a stream of audio data frames, at least one function of the automated assistant can be activated in response to detecting a spoken invocation phrase, such as a function that causes one or more subsequently received audio data frames to be transmitted to one or more remote automated assistant servers for further processing. Also, for example, when techniques are utilized to detect voice characteristics in a stream of audio data frames (e.g., for speaker identification), content generated by the automated assistant can be adapted based on a speaker identified using the detected voice characteristics.

In various implementations, audio data frames that are based on output from one or more microphones of a client device are processed using the adaptive noise cancellation model to generate respective output. The generated output for each audio data frame indicates whether the audio data frame has one or more target features (e.g., target keyphrase(s)), and is used to tag the audio data frame with a corresponding output indication. As a working example, the generated output for each audio data frame can indicate a corresponding probability of each of a plurality of target keyphrase(s), and optionally a corresponding probability for "no target keyphrases". Continuing with the working example, the output indication for each audio data frame can be a "trigger" indication if the output indicates at least a first "high" threshold probability for any one of the trigger keyphrases; can be a "near-trigger" indication if the output fails to indicate at least the first threshold probability for any of the trigger keyphrases, but indicates a probability, for any one of the trigger keyphrases, that is less than the first threshold probability, but greater than a second "low" threshold probability; and can be a "noise" indication if the output indicates less than the second threshold probability for all of the trigger keyphrases (and/or indicates greater than a third threshold probability for "no trigger keyphrases").

In some of those various implementations, the audio data frames and their corresponding output indications can be stored in a first in, first out (FIFO) buffer, and the contents of the buffer can be periodically (or at other regular and/or non-regular interval) assessed to determine further processing to perform based on the contents of the buffer. Continuing with the working example, if the audio data frames of the buffer at a given instance all have output indications indicative of "noise", at least one of the audio data frames of the buffer can be utilized to adapt a noise reduction technique. For example, an audio data frame that includes at least a first channel (based on a first microphone) and a second channel (based on a second microphone) can be "popped" from the buffer and utilized to adapt an adaptive noise cancellation filter (or adapt another noise reduction technique, such as beamforming). If the audio data frames of the buffer at a given instance include no output indications indicative of a "trigger", but include at least one output indication indicative of a "near trigger", the entire buffer can be flushed and the audio data frames processed using the noise reduction technique, as most recently adapted, to generate filtered data frames. The filtered data frames can then be processed using an additional trained machine learning model to determine whether an invocation phrase is present in the filtered audio data frames. The additional machine learning model can be the same as (but optionally a separate instance of) the machine learning model utilized to determine the output indications, or can optionally be a separate model such as a more robust model that may be more computationally intensive to utilize. If the audio data frames of the buffer at a given instance include at least one output indication indicative of a "trigger", the entire buffer can be flushed and the audio data frames of the buffer processed using an additional trained machine learning model to determine whether an invocation phrase is present in the additional machine learning model. In some implementations, the audio data frames of the buffer when a trigger output indication is present can additionally or alternatively be processed using the adaptive noise reduction technique, as most recently adapted, to generate filtered data frames—and such frames processed using the additional trained machine learning model to determine whether an invocation phrase is present.

In some implementations, the keyphrase detection system can perform one or more actions mapped to a particular keyphrase in response to determining that the speaker verification output indicates a target speaker spoke the utterance and determining that the spoken utterance contains the particular keyphrase. In other words, the keyphrase detection system is only triggered when both the speaker verification output indicates a target speaker spoke the utterance and the spoken utterance contains a particular keyphrase, and does not trigger if only one (or neither) of the conditions are satisfied.

Accordingly, various implementations set forth techniques for keyphrase detection to reduce false triggering and/or false rejections, where the keyphrase detection system can be customized to detect virtually any spoken utterance where the detected keyphrase is not constrained to specific word(s) and/or specific phrase(s). Conventional keyphrase detection techniques are trained to recognize a single predefined phrase or a few predefined phrases. The entire conventional keyword detection system needs to be retrained to detect one or more new keyphrases. Retraining the keyword detection system can be computationally expensive and/or time consuming. System resources (e.g., memory, power, processor cycles, etc.) can be conserved by using a streaming keyword detection system. In contrast, streaming keyphrase detection techniques described herein can recognize one or more new keyphrases without any (or with minimal) retraining.

Additionally or alternatively, a conventional keyphrase detection system requires the user to first speak one of the predefined keyphrases prior to speaking a command. For example, the user must speak the keyphrase "OK Assistant" before speaking the command "turn off the lights". Streaming keyphrase detection systems disclosed herein can provide a more streamlined user experience by allowing a user to generate a keyphrase mapped to frequently utilized command(s). For example, the user can speak the keyphrase "turn off the lights" without the need to speak "OK Assistant". Furthermore, computing resources can be conserved by eliminating the need to process "OK Assistant" in addition to processing "turn off the lights".

The above description is provided only as an overview of some implementations disclosed herein. These and other implementations of the technology are disclosed in additional detail below.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1:
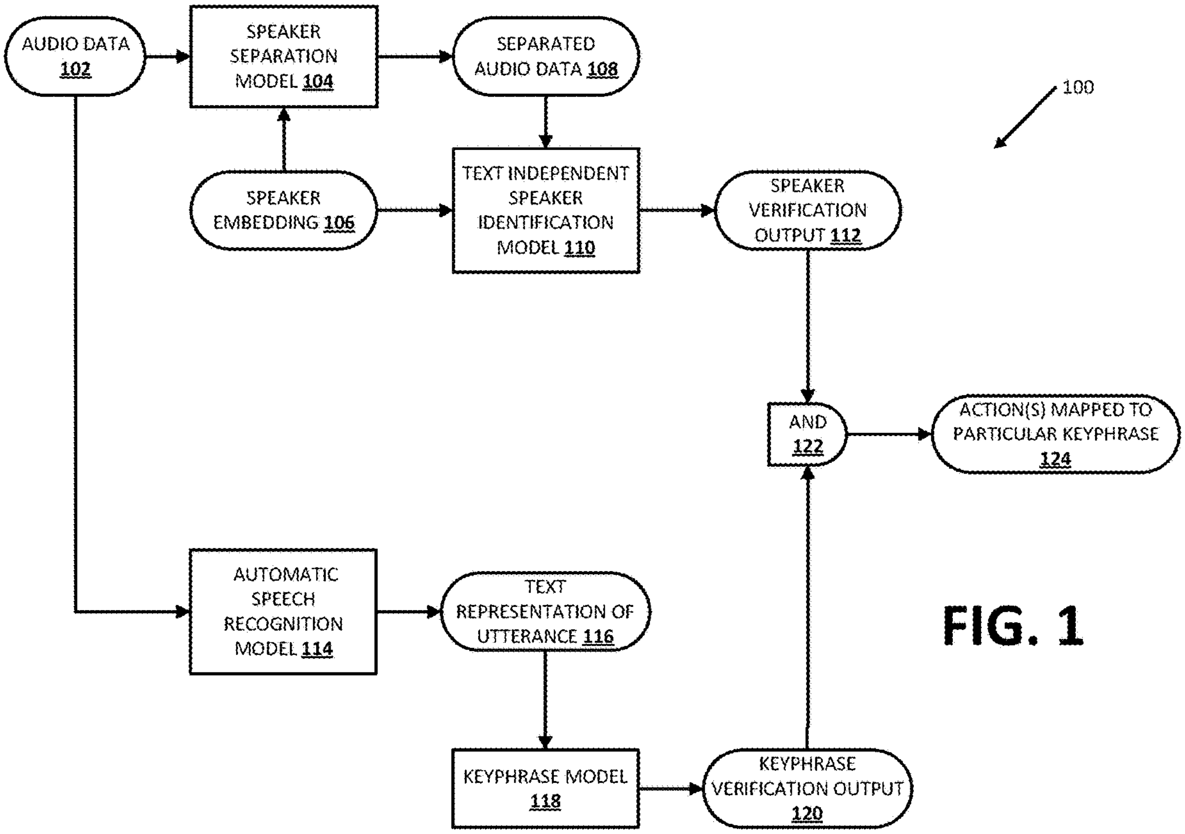
FIG. 1 illustrates an example of performing actions mapped to a particular keyphrase in accordance with various implementations disclosed herein.

Implementations disclosed herein include a streaming keyphrase detection system that can be easily customized to accurately detect any phrase composed of words from a large vocabulary. In some implementations, the system is implemented with an end-to-end trained automatic speech recognition (ASR) model and a text-independent speaker verification model. Additionally or alternatively, to address the challenge of detecting these keyphrases under various noisy conditions, a speaker separation model can be added to the feature frontend of the speaker verification model, and/or an adaptive noise cancellation (ANC) algorithm can be included to exploit cross-microphone noise coherence. In some implementations, it can be shown that the text-independent speaker verification model largely reduces the false triggering rate of the keyphrase detection, while the speaker separation model and/or adaptive noise cancellation largely reduce false rejections.

In most voice assistive technologies, keyword spotting (i.e., wake word detection) is a common way to initiate the human-machine conversation (e.g., "OK Assistant", "Assistant", and/or "Hey Assistant"). In recent years, keyword spotting techniques have evolved with many exciting advances, for example, using deep neural networks, or end-to-end models.

However, many conventional keyword spotting models are based on single or a few predefined phrases, often assuming the keyword is covered by a fixed-length window of audio. Supporting a new phrase usually requires re-training the entire system, which can be resource and time consuming.

In many scenarios, users would largely prefer a more seamless and natural interaction with the voice assistant without having to say a predefined keyword; especially for simple commands, such as "Turn on the lights". However, these interactions may pose new challenges for conventional keyword spotting systems. For example, a keyword spotting model may need to be able to detect a large corpus of keyphrases. Additionally or alternatively, the keyphrases may have variable length, from a single word (e.g., "Stop") to longer sentences (e.g., "What is the weather tomorrow?"). The audio duration of the keyphrases could also vary depending on the speaker. Furthermore, the set of recognized keyphrases should be easily customizable without training and deploying new models.

Instead of using a dedicated keyphrase detection model, some implementations can utilize a generic ASR model that allows user-defined keyphrases, thereby providing greater flexibility to the users. A distinct challenge of a keyphrase detection that has not previously been addressed by conventional keyword detection systems is being able to discriminate between the spoken keyphrases and noise in the background. This can be especially difficult if the ambient noise includes speech that contains similar keyphrases. For example, a speaker on TV saying "turn off the lights" could easily false trigger the system.

Recognizing speech in a noisy, multi-talker environment (e.g., the cocktail-party problem), is an active area of research. The human brain has the remarkable ability to identify and separate one person's voice from another, especially if the speaker is familiar. One way the brain solves the cocktail-party problem is by using top-down attention to identify vocal features from a known speaker, while filtering out other irrelevant ambient sounds. In various implementations, vocal features of the enrolled speaker can be represented with neural network embeddings, and this information can be used to suppress background speech from unknown speakers in the feature frontend of the speaker verification model.

Additionally or alternatively, on devices with multiple microphones separated by a small distance (e.g., smart home speakers), an adaptive noise cancellation algorithm can further enhance the speech signals by suppressing background noise.

Various implementations may include: (1) adopting the state-of-the-art RNN-T model and apply pruning so that it can run continuously on device with significantly reduced CPU usage; (2) combining the RNN-T based ASR model with speaker verification and speaker separation models to achieve low false trigger and false rejection rates under various noise conditions; and/or (3) using an adaptive noise cancellation algorithm that generalizes Hotword Cleaner for generic speech recognition.

In some implementations, a shared feature frontend can be used by all speech models in the system. For example, this frontend can first apply automatic gain control to the input audio, and then can extract 32 ms-long Hanning-windowed frames with a step of 10 ms. For each frame, 128-dimensional log Mel-filterbank energies can be computed in the range between 125 Hz and 7500 Hz. These filterbank energies can then be stacked by 4 frames and subsampled by 3 frames, resulting in final features of 512 dimensions with a frame rate of 30 ms. However, this frontend is merely illustrative, and audio data can be processed using additional or alternative procedures.

The speaker embedding (also referred to herein as a d-vector) is an embedding vector that represents the voice characteristics of the enrolled user. It can be obtained by prompting the user to follow an offline voice enrollment process. At runtime, the d-vector can be used in two ways: (1) It can be used as a side input to the speaker separation model to remove feature components not from the target speaker; and/or (2) It can represent the enrolled speaker in the speaker verification model.

In some implementations, the keyphrase detection system only triggers when both the following conditions are met: (1) The text-independent speaker verification system can successfully be verified against the target enrolled user; and (2) The recognized text from the speech recognition model can be successfully matched with one of the predefined keyphrases.

In many implementations, there may be two main sources of errors: (1) False accepts, where either a phrase other than the keyphrase or a keyphrase spoken by an unknown speaker (for example, in the background) triggers the detection system. (2) False rejects, where either the keyphrase was not recognized correctly by the ASR model, or the target user was misidentified by the speaker verification system.

In some implementations, the speech recognition model can be an end-to-end RNN Transducer (RNN-T) model. As an example of an RNN-T model, the target output vocabulary can consist of 4096 word-pieces. Additionally or alternatively, the encoder network can have 8 CIFG-LSTM layers and the prediction network can have 2 CIFG-LSTM layers. Each CIFG-LSTM layer can have 2048 hidden units followed by a projection size of 640 units. The joint network can have 640 hidden units and a softmax layer with 4096 units. In some implementations, the speech recognition model needs to run continuously on device, the model can be shrunk by applying 60% sparsity to each CIFG-LSTM layer in order to reduce the CPU usage, and consequently prolong the life of the device. For example, the total model size can be 42 MB after sparsification and quantization. In some implementations, the example RNN-T model can be trained on 400K hours of multi-domain data including YouTube, voice search, farfield and telephony speech. Additionally or alternatively, domain-ID can be added to the example RNN-T model input during model training and inference, which can improve the speech recognition quality in the target domain.

Various implementations can focus on home automation applications in the evaluation. For instance, the voice search and farfield domains can be combined with a shared domain-ID during training, and/or this ID can be used during inference. However, since the target keyphrases tested in some implementations are common voice command queries, such as "Stop" or "Turn on the light", they appear frequently in the target domain training data. This in turn can cause the ASR to have an implicit bias towards hypothesizing these keyphrases during inference.

Many keyword spotting systems are shipped together with a speaker verification (SV) model. The speaker verification model may not only enable features such as personalized queries (e.g. "What's on my calendar?"), but may also largely reduce the false accept rate of the keyword spotting system.

Since conventional keyword spotting systems only support single and/or a few keywords (e.g. "OK Assistant" and "Hey Assistant"), the speaker verification model shipped with them typically is text-dependent. However, for a personalized keyphrase detection system, in accordance with many implementations, that needs to support theoretically an infinite number of keyphrases, a text-independent speaker verification model may be used.

Various implementations can use a text-independent model trained with the generalized end-to-end loss. For example, the training data can be from a vendor collected multi-language speech query dataset covering 37 locales. Additionally or alternatively, the training data can include public datasets including LibriVox, VoxCeleb, CN-Celeb, TIMIT, VCTK, Spoken Wikipedia Corpora, and BookTube-Speech for domain robustness. In some implementations, multi-style training (MTR) can be applied during the training process for noise robustness. As a further example, the speaker verification model can have 3 LSTM layers each with 768 nodes and/or a projection size of 256. Additionally or alternatively, the output of the last LSTM layer can be linearly transformed to the final 256-dimension d-vector.

Since the ASR model may be implicitly biased towards the keyphrases via domain-ID, even under noisy background conditions, the false rejection rate of the keyphrase detection in various implementations may still be low. Additionally or alternatively, speaker verification systems may be vulnerable to overlapping speech. For example, when the target user and an interfering speaker speak at the same time, the speaker verification system might reject the utterance, as the d-vector computed from overlapping speech would be very different to the d-vector derived from the target user speech alone.

Since speaker verification is critical to reducing false triggering, it may be important to address the challenge of accurate speaker verification in multi-talker conditions. In some implementations, a voice filter model can be used to enhance the input features from the enrolled speaker to the speaker verification model while masking out background speech.

Unlike other speech enhancement or separation models, the voice filter model has these benefits: (1) It directly enhances filterbank energies instead of the audio waveform, which largely reduces the number of runtime operations; (2) It supports streaming inference with low latency; (3) It uses an adaptive suppression strength, such that it is only effective on overlapping speech, avoiding unnecessary over-suppression; (4) It is optimized for on-device applications.

Many devices, such as smart speakers and mobile phones, have more than one microphone. On these devices, an adaptive noise-cancellation (ANC) algorithm can be used to learn a filter that suppresses noise based on the correlation of the audio signals at multiple microphones during noise-only segments.

Unlike conventional techniques where the adaptive filter coefficients are estimated using a FIFO buffer, in many implementations the adaptive filter coefficients are determined from a period of non-speech audio that precedes the speech signal. For example, the adaptive filter coefficients can be determined from a three second-long period of non-speech audio that precedes the speech signal. These coefficients may be kept frozen in order to suppress noise during the epoch containing speech.

Many implementations include a streaming personalized keyphrase detection system that is highly robust to background noise and overlapping speech. An RNN-T based ambient ASR model that was pruned to fit on-device constraints and implicitly biased it towards voice commands via domain-id may be used in various implementations. To compensate for false triggering caused by biasing, a text-independent speaker verification model that rejected all keyphrases from non-enrolled speakers can be utilized. To mitigate the increased false rejections caused by speaker verification in the multi-talker scenario, a speaker separation model can be added to the feature frontend of the speaker verification system. Additionally or alternatively, a multi-microphone adaptive noise cancellation algorithm can be used to further reduce the false rejection rate for noisy conditions.

Turning now to the figures, FIG. 1 illustrates an example of performing actions mapped to a particular keyphrase in accordance with various implementations disclosed herein. In the illustrated example 100, audio data 102 and a speaker embedding 106 can be processed using a speaker separation model 104 to generate separated audio data 108. In some implementations, the audio data 102 can capture an utterance spoken by a human speaker and one or more sounds which are not spoken by the human speaker. For example, the audio data can capture a spoken utterance of "turn down the thermostat by 5 degrees" spoken by Katherine as well as one or more sounds not spoken by Katherine such as (but not limited to) an additional utterance spoken by Caleb, the sound of a dog barking, and/or the sound of a phone ringing. Additional or alternative sounds not spoken by the human speaker can be captured in the audio data including utterance(s) spoken by one or more further speakers, one or more additional sounds not spoken by a human speaker, and/or combinations thereof.

The speaker embedding 106 can be associated with a human speaker. In some implementations, the speaker embedding 106 can be a pre-generated speaker embedding (e.g., a speaker embedding previously generated using an enrollment processes), using voice fingerprinting, image recognition, a passcode, and/or other verification techniques to determine the human speaker currently active and, as a result, the speaker embedding for the currently active human speaker. The speaker embedding 106 can correspond to a registered user of a client device. For example, the speaker embedding 106 can correspond to the owner of a cellular phone. In some implementations, multiple users can be associated with a client device, each user having a corresponding speaker embedding. For example, two users living together can be associated with a standalone interactive speaker located in the house, where each user has a corresponding speaker embedding.

Speaker separation model 104 can be used to isolate portion(s) of audio data 102 spoken by the human speaker who corresponds to speaker embedding 106. In other words, the separated audio data 108 contains the utterance spoken by the human speaker corresponding to speaker embedding 106 and excludes the one or more additional sounds that are not spoken by the human speaker. In some implementations, speaker separation model 104 can be a voice filter model. A predicted mask can be generated by processing audio data 102 and speaker embedding 106 using a voice filter model. Separated audio data 108 can be generated based on processing audio data 102 along with the predicted mask. In some implementations, separated audio data 108 can be generated by convolving the predicted mask with audio data 102. Generating separated audio data 108 by processing audio data 102 and a predicted mask generated using a voice filter model in accordance with some implementations is described herein with respect to FIG. 4. In some implementations, the speaker embedding 106 can be generated in accordance with FIG. 3 described herein.

Separated audio data 108 and the speaker embedding 106 can be processed using a text independent speaker identification (TI-SID) model 110 to generate speaker verification output 112. In text dependent (TD) speaker identification, the speaker embedding of a user is generated based on spoken utterances that include only one or more specific words and/or one or more specific phrases. Moreover, in use, the user must speak the one or more specific words/phrases for output to be generated, using a TD speaker identification model that sufficiently matches the speaker embedding. As one example, the one or more specific words/phrases in TD speaker recognition can be constrained to one or more invocation phrases configured to invoke an automated assistant (e.g., "Hey Assistant", "OK Assistant", and/or "Assistant").

In contrast, in text independent (TI) speaker identification, audio data processed using the TI-SID model is not constrained to specific word(s) and/or specific phrase(s). In other words, audio data based on virtually any spoken utterance can be processed using the TI-SID model to generate output which can be effectively compared to the speaker embedding for a particular user to determine whether the spoken utterance is from the particular user. Moreover, in various implementations the speaker embedding of a user utilized in TI speaker identification is generally based on spoken utterances that include disparate words and/or phrases.

In some implementations, speaker verification output 112 can provide an indication of whether the utterance captured in separated audio data 108 was spoken by the human speaker corresponding to speaker embedding 106. For example, the system can generate binary output (e.g., yes/no, 0/1, etc.) indicating whether the human speaker corresponding to speaker embedding 106 spoke the utterance captured in separated audio data 108. Additionally or alternatively, the system can generate a probability indicating the likelihood the human speaker corresponding to speaker embedding 106 spoke the utterance captured in separated audio data 108.

Automatic speech recognition (ASR) model 114 can be used to process audio data 102 to generate a text representation of the utterance 116. For example, Katherine can speak the utterance of "turn off the garage lights". ASR model 114 can be used to process audio data capturing the utterance "turn off the garage lights" to generate a text representation of "turn off the garage lights". In some implementations, ASR model 114 can be used to process separated audio data 108 in addition to or alternatively to audio data 102 (not depicted) to generate the text representation of the utterance 116.

The text representation of the utterance 116 can be processed using a keyphrase model 118 to determine whether the text representation of the utterance corresponds to a particular keyphrase, of one or more keyphrases associated with the user. For instance, the system can determine whether "turn off the garage lights" corresponds to a keyphrase of Katherine. In some implementations, the system can generate keyphrase verification output 120 by processing the text representation of the utterance 116 using the keyphrase model 118. In some implementations, the keyphrase verification output 120 can include binary output (e.g., yes/no, 0/1, positive/negative, etc.) indicating whether the text representation of the utterance 116 corresponds to a particular keyphrase of the user. In some implementations, the particular keyphrase of the user can be a personalized keyphrase of the user and/or a custom keyphrase generated by the user. For example, the user can set up (through a keyphrase generation process) a keyphrase of "set the thermostat to my bedtime temperature" where the system adjusts a smart thermostat to a temperature the user prefers for when they are sleeping.

Additionally or alternatively, the particular keyphrase can be associated with a third party application, where speaking the particular keyphrase causes an application associated with the third party to perform one or more actions. For example, the particular keyphrase can be associated with the third party application of 'Hypothetical Music Player'. The user can speak the particular keyphrase of "Hypothetical Music Player, play my driving playlist" to cause the 'Hypothetical Music Player' to begin playing a playlist associated with the user.

The system can perform action(s) mapped to the particular keyphrase 124 based on comparing the speaker verification output 112 and the keyphrase verification output 120. In some implementations, the system can compare the speaker verification output 112 and the keyphrase verification output 120 using an AND gate 122, where the systems only performs action(s) when the speaker verification output 112 indicates a registered and/or verified user spoke the utterance and the keyphrase verification output 120 indicates the text representation of the utterance is a particular keyphrase associated with the user. In other words, the system will not perform action(s) if either the speaker verification output 112 indicates the speaker is not a registered and/or verified user or the keyphrase verification output 120 indicates the text representation of the utterance is not a particular keyphrase associated with the user.

Figure 2:
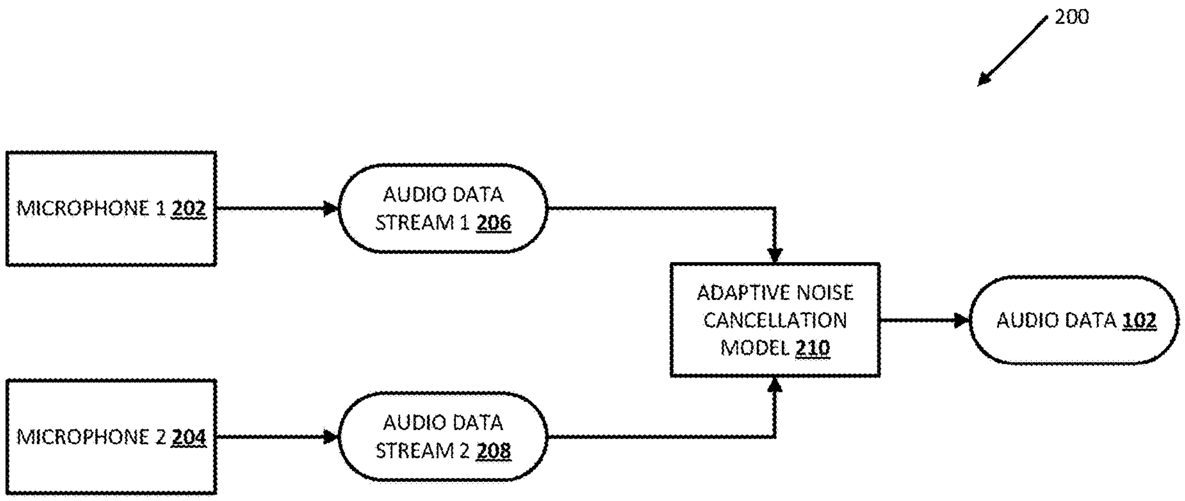
FIG. 2 illustrates an example of processing audio data stream(s) using an adaptive noise cancellation model to generate an audio data stream in accordance with various implementations disclosed herein.

FIG. 2 illustrates an example 200 of using an adaptive noise cancellation model 210 to generate audio data 102. In some implementations, the system can optionally generate the audio data 102 by optionally processing the output of one or microphones using an adaptive noise cancellation model 210. For example, audio data stream 1 206 can be captured using microphone 1 202, and audio data stream 2 208 can be captured using microphone 2 204 using an adaptive noise cancellation model 210 to generate the audio data 102. In some implementations the adaptive noise cancellation model 210 can process audio data from the one or more microphones and generate output indicating the probability each audio data frame, of each audio data stream, includes at least a portion of target keyphrase(s).

For example, the generated output for each audio data frame can indicate a corresponding probability of each of a plurality of target keyphrase(s), and optionally a corresponding probability for "no target keyphrases". Continuing with the working example, the output indication for each audio data frame can be a "trigger" indication if the output indicates at least a first "high" threshold probability for any one of the trigger keyphrases; can be a "near-trigger" indication if the output fails to indicate at least the first threshold probability for any of the trigger keyphrases, but indicates a probability, for any one of the trigger keyphrases, that is less than the first threshold probability, but greater than a second "low" threshold probability; and can be a "noise" indication if the output indicates less than the second threshold probability for all of the trigger keyphrases (and/or indicates greater than a third threshold probability for "no trigger keyphrases").

In some of those various implementations, the audio data frames and their corresponding output indications can be stored in a first in, first out (FIFO) buffer, and the contents of the buffer can be periodically (or at other regular and/or non-regular interval) assessed to determine further processing to perform based on the contents of the buffer. Continuing with the working example, if the audio data frames of the buffer at a given instance all have output indications indicative of "noise", at least one of the audio data frames of the buffer can be utilized to adapt a noise reduction technique. For example, an audio data frame that includes at least a first channel (based on a first microphone) and a second channel (based on a second microphone) can be "popped" from the buffer and utilized to adapt an adaptive noise cancellation filter (or adapt another noise reduction technique, such as beamforming). If the audio data frames of the buffer at a given instance include no output indications indicative of a "trigger", but include at least one output indication indicative of a "near trigger", the entire buffer can be flushed and the audio data frames processed using the noise reduction technique, as most recently adapted, to generate filtered data frames. The filtered data frames can then be processed using an additional trained machine learning model to determine whether an invocation phrase is present in the filtered audio data frames. The additional machine learning model can be the same as (but optionally a separate instance of) the machine learning model utilized to determine the output indications, or can optionally be a separate model such as a more robust model that may be more computationally intensive to utilize. If the audio data frames of the buffer at a given instance include at least one output indication indicative of a "trigger", the entire buffer can be flushed and the audio data frames of the buffer processed using an additional trained machine learning model to determine whether an invocation phrase is present in the additional machine learning model. In some implementations, the audio data frames of the buffer when a trigger output indication is present can additionally or alternatively be processed using the adaptive noise reduction technique, as most recently adapted, to generate filtered data frames—and such frames processed using the additional trained machine learning model to determine whether an invocation phrase is present.

Figure 3:
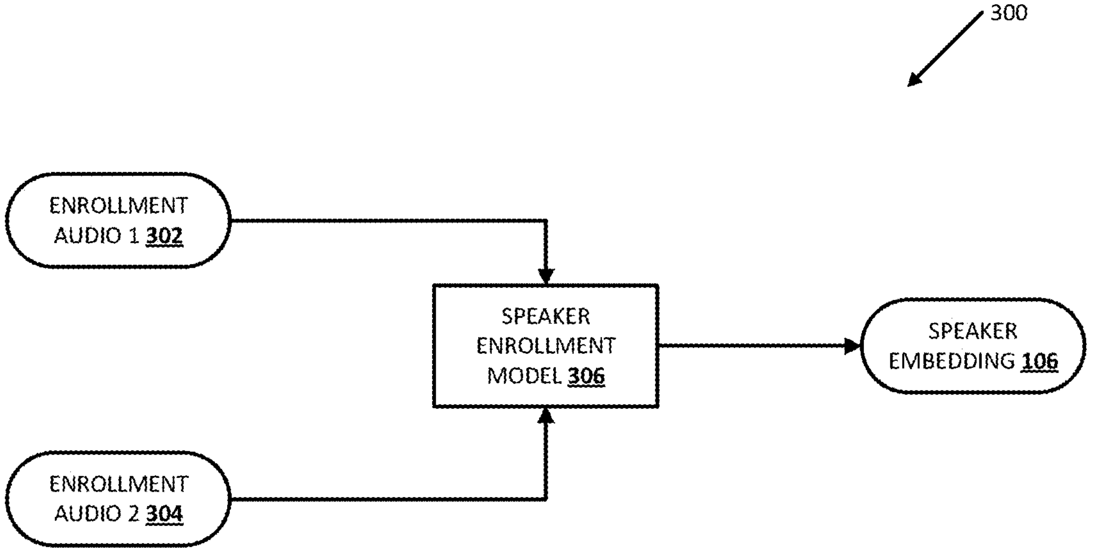
FIG. 3 illustrates an example of generating a speaker embedding corresponding to a speaker in accordance with various implementations disclosed herein.

FIG. 3 illustrates an example of generating a speaker embedding in accordance with various implementations, In the illustrated example 300, the system processes enrollment audio data 1 302 and enrollment audio data 2 304 using a speaker enrollment model 306 to generate the speaker embedding 106. In some implementations, the enrollment process may be text independent, where enrollment audio capturing virtually any spoken utterance spoken by a given user can be processed using the speaker enrollment model 306 to generate the speaker embedding 106 corresponding to the given user. Additionally or alternatively, the enrollment process can be text dependent, where the system processes enrollment audio captures one or more predefined words and/or phrases spoken by the given user using speaker enrollment model 306 to generate speaker embedding 106. In the illustrated example 300, the system processes two instances of enrollment audio (e.g., enrollment audio 1 302 and enrollment audio 2 304) to generate the speaker embedding 106. However, this is merely illustrative and is not meant to be limiting. In some implementations, the system can generate the speaker embedding 106 based on a fewer number of instances of enrollment audio (e.g., a single instance of enrollment audio) or a greater number of instances of enrollment audio (e.g., three instances of enrollment audio, four instances of enrollment audio, 10 instances of enrollment audio, etc.).

Figure 4:
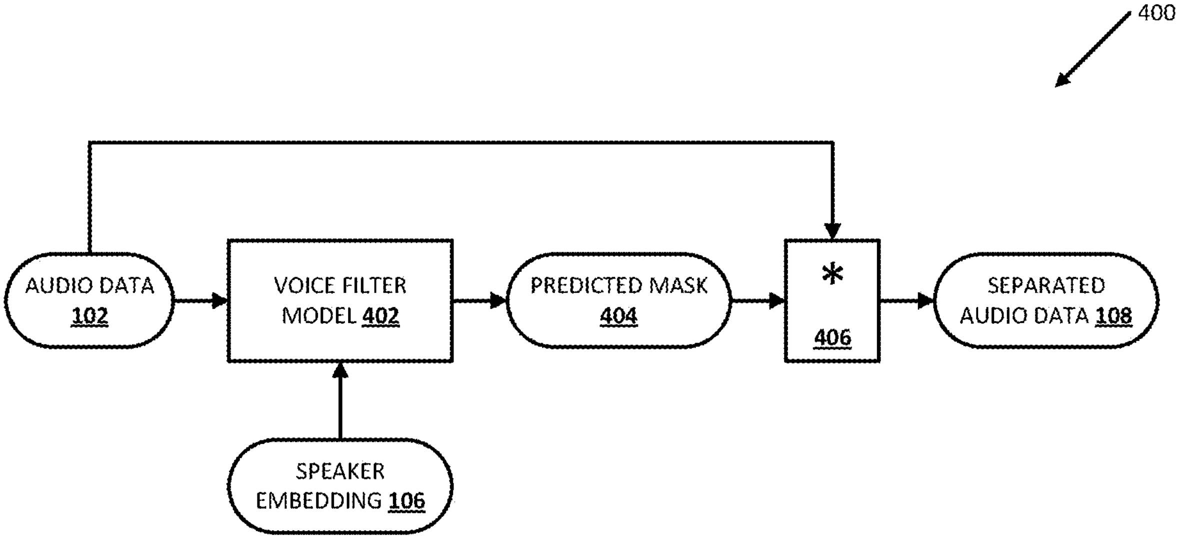
FIG. 4 illustrates an example of generating separated audio data using a voice filter model in accordance with various implementations disclosed herein.

FIG. 4 illustrates an example of processing audio data using a voice filter model to generate separate audio data. In the illustrated example 400, audio data 102 and speaker embedding 106 can be processed using a voice filter model 402 to generate a predicted mask 404. In some implementations, a frequency representation of the audio data (not depicted) can be processed with the speaker embedding 106 using voice filter model 402 to generate the predicted mask 404. In some of those implementations, the frequency representation of the audio data can be, for example, streaming audio data that is processed in an online manner (e.g., in real-time or in near real-time) or non-streaming audio data that has been previously recorded.

The speaker embedding 106 is an embedding for a given human speaker, and can be generated based on processing one or more instances of audio data, from the given speaker, using a speaker enrollment model. In some implementations, the speaker embedding can be generated in accordance with FIG. 3 described herein. As described herein, in some implementations, the speaker embedding 106 is previously generated by a speaker enrollment process based on previous instance(s) of audio data from the given speaker. In some of those implementations, the speaker embedding 106 is associated with an account of the given speaker and/or a client device of the given speaker, and the speaker embedding 106 can be provided for utilization with the frequency representation of the audio data based on the frequency representation coming from the client device and/or the digital system where the account has been authorized.

In some implementations, the system can optionally process the frequency representation of the audio data using a power compression process to generate a power compression (not depicted). In some of those implementations, the power compression process can equalize (or partially equalize) the importance of quieter sounds relative to loud sounds in the audio data. Additionally or alternatively, the system can optionally process the frequency representation of the audio data using a normalization process to generate a normalization (not depicted), and can optionally process speaker embedding 106 using the normalization process to generate a normalized speaker embedding (not depicted).

The frequency representation can be applied as input to a convolutional neural network (CNN) portion (not depicted) of the voice filter model 402. In many implementations, the CNN portion is a one dimensional convolutional neural network. In many implementations, the convolutional output generated by the CNN portion, as well as the speaker embedding 106, can be applied as input to a recurrent neural network (RNN) portion (not depicted) of the voice filter model 402. In many implementations, the RNN portion can include uni-directional memory units (e.g., long short term memory units (LSTM), gated recurrent units (GRU), and/or additional memory unit(s)). Additionally or alternatively, RNN output generated by the RNN portion can be applied as input to a fully connected feed-forward neural network portion (not depicted) of the voice filter model 402 to generate a predicted mask 404. In many implementations, the CNN portion can be omitted and the frequency representation of the audio data and the speaker embedding 106 can both be applied as input to the RNN portion.

The audio data 102 (and/or frequency representation of the audio data) can be processed with predicted mask 404 to generate separated audio data. For example, the audio data 102 can be convolved 406 with the predicted mask 404 to generate the separated audio data 108.

In many implementations, the separated audio data 108 can: be the same as the audio data 102 when the audio data 102 includes only utterance(s) from the speaker corresponding to the speaker embedding 106; be null/zero when the audio data 102 lacks any utterances from the speaker corresponding to the speaker embedding 106; or exclude additional sound(s) while isolating utterance(s) from the speaker corresponding to the speaker embedding 106, when the audio data 102 includes utterance(s) from the speaker and additional sound(s) (e.g., overlapping utterance(s) of other human speaker(s) and/or additional background noise).

Figure 5:
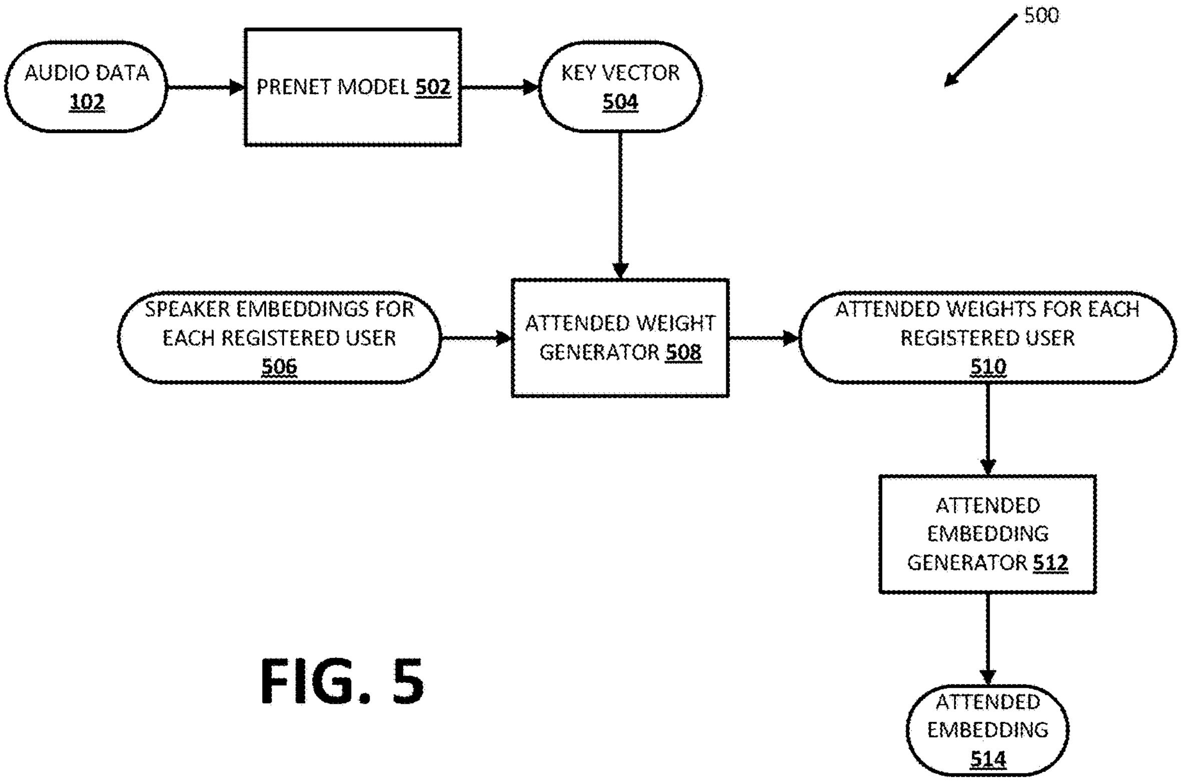
FIG. 5 illustrates an example of generating an attended speaker embedding for multiple users in accordance with various implementations disclosed herein.

FIG. 5 illustrates an example of generating an attended speaker embedding for multiple users in accordance with various implementations disclosed herein. Speaker-aware technologies, such as voice filter technology generally assume the neural network takes a single embedding (also referred to herein as a d-vector) as a side input, thus can only be personalized for a single user at runtime. However, many smart devices, such as home speakers, can be a shared device among multiple users. For example, smart home speakers are usually shared between multiple family members. In such cases, conventional voice filter model techniques may be impractical to use.

In some implementations, a voice filter model (such as voice filter model 402 illustrated in FIG. 4) can be represented as:

$$y_t = \mathrm{Net}(concat(x_t, d)) \tag{1}$$

Where $x_t$ is the input frame of audio data, $y_t$ is the output, d is the speaker embedding of the target speaker, Net is a neural network, such as a LSTM network, and concat is the concatenation operation.

In some implementations, a system, such as a shared smart home speaker, may have an unknown number of users. In some of those implementations, the system may have multiple speaker embeddings, each corresponding to a distinct user of the shared device. For example, assume we have three users of a shared device and three corresponding speaker embeddings: $d_1$, $d_2$, and $d_3$.

In some implementations, the speaker embeddings can be concatenated from multiple enrolled users. The concatenated speaker embeddings can be processed using the voice filter model to generate the predicted mask. In some versions of those implementations, the system needs to know the maximal number of enrolled users in advance. For example, the system can have three speaker embeddings $d_1$, $d_2$, and $d_3$ corresponding to three enrolled users. The resulting multi-user voice filter model can be represented as:

$$y_t = Net(concat(x_t, d_1, d_2, d_3)) \tag{2}$$

Where $x_t$ is the input frame of audio data, $y_t$ is the output, $d_1$ is a speaker embedding of a first registered user, $d_2$ is a speaker embedding of a second registered user, $d_3$ is a speaker embedding of a third registered user, Net is a neural network, such as a LSTM network, and concat is the concatenation operation.

At inference time, there may be fewer enrolled users than the maximal number of enrolled users. In some implementations, the speaker embeddings for a "missing" enrolled users can be set to an all zero vector. For example, if the multi-user system was designed with a maximum of three users, but only has two enrolled users, the system can set one of the speaker embeddings equal to an all zero vector (e.g., set $d_3=0$). As a further example, if the multi user system was designed for three users, but only has a single enrolled user, the system can set two of the speaker embeddings equal to an all zero vector (e.g., set $d_2=d_3=0$).

Additionally or alternatively, in some implementations the speaker embeddings of multiple registered users can be interleaved, where the speaker embeddings are mixed by alternating between them (as opposed to concatenated as described above). The resulting multi-voice filter model can be represented as:

$$y_t = \mathrm{Net}(concat(x_t, d_t)) \tag{3}$$

Where $d_t=d_1$ when t mod 3=0; $d_t=d_2$ when t mod 3=1; and $d_t=d_3$ when t mod 3=2.

Furthermore, in some implementations the speaker embeddings can be combined using an attention mechanism to attend to the speaker embeddings with different weights.

In some implement, an attention network, such as the PreNet model 502, can be used to process the audio data 102 to generate a key vector 504, where the key vector 504 has the same dimensionality as the speaker embeddings as illustrated in equation 2, where $k_t$ represents key vector 504.

$$k_t = PreNet(x_t) \tag{4}$$

In some implementations, attended weights 510 can be generated for each registered user of the shared device by processing the speaker embedding for each registered user 506 and the key vector 504 using an attended weight generation process 508. In some implementations, the attended weights at 506 can be generated based on:

$$\alpha_t = \mathrm{softmax}\left(k_t \cdot \frac{d_1}{\sqrt{D}},\ k_t \cdot \frac{d_2}{\sqrt{D}},\ k_t \cdot \frac{d_3}{\sqrt{D}}\right) \tag{5}$$

In some implementations, an attended embedding 514 can be generated by processing the attended weights 510 using an attended embedding processor, where $Y_t$ represents the attended embedding 514. In some of those implementations, the attended embedding 514 can be generated as a linear combination of the enrolled user embeddings:

$$\gamma_t = \alpha_{t,1} \cdot d_1 + \alpha_{t,2} \cdot d_2 + \alpha_{t,3} \cdot d_3) \tag{6}$$

In some implementations, the attended embedding 514 can be used in the voice filter model to replace the speaker embedding. In other words, the multi-user voice filter model can be represented by:

$$y_t = \text{Net}(concat(x_t, \gamma_t))) \quad (7)$$

In other words, the attended embedding 514 can be processed with audio data using a voice filter model to generate a predicted mask. The predicted mask can be convolved with the audio data to generate separated audio data, where utterance(s) spoken by the registered users of the shared device are isolated from background noise.

In some implementations, different enrolled user embeddings may be permutation-invariant, thus the system may not need to permute the training data for robustness. Additionally or alternatively, a multi-user voice filter model can support an arbitrary number of enrolled users where the computational cost only minimally increases for the additional users.

Additionally or alternatively, in some implementations, separated audio data can be generated for multiple registered users of a shared device using one or more additional cues indicating the speaker of the utterance. For example, a camera of the shared device can identify one of the registered users in the environment and the speaker embedding corresponding to that user. The system can identify the user in the environment with the shared device based on a signal from a non-shared device registered with a particular user, such as based on a signal from a cell phone registered with a particular user indicating the particular user is in close proximity to the shared device. Additional or alternative cue(s) may be utilized. In some implementations, the speaker embedding corresponding to the identified user can be processed using the voice filter model as illustrated in FIG. 4 herein. In other words, in a multi-user situation, the separated audio data can be generated based on the speaker embedding for the identified user without needing to generate the attended embedding 514.

Figure 6:
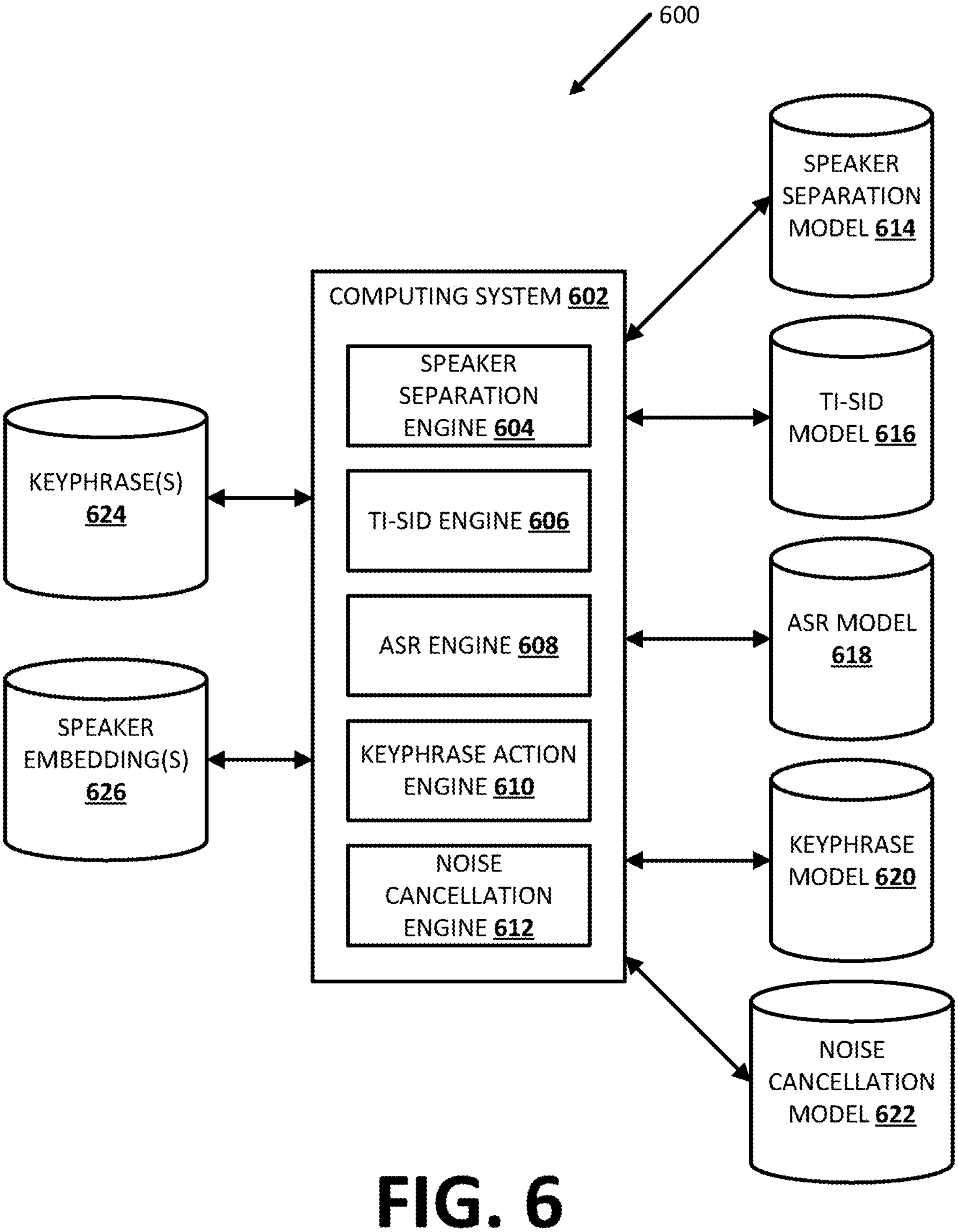
FIG. 6 illustrates a block diagram of an example environment in which various implementations disclosed herein may be implemented.

FIG. 6 illustrates a block diagram of an example environment 600 in which implementations disclosed herein may be implemented. The example environment 600 includes a computing system 602 which can include speaker separation engine 604, TI-SID engine 606, ASR engine 608, keyphrase action engine 610, noise cancellation engine 612, one or more additional or alternative engines (not depicted), and/or combinations thereof. Additionally or alternatively, computing system 202 may be associated with speaker separation model 614, TI-SID model 616, ASR model 618, keyphrase model 620, noise cancellation model 622, one or more keyphrases 624, one or more speaker embeddings 626, one or more additional or alternative components (not depicted), and/or combinations thereof.

In some implementations, computing system 602 may include may include user interface input/output devices (not depicted), which may include, for example, a physical keyboard, a touch screen (e.g., implementing a virtual keyboard or other textual input mechanisms), a microphone, a camera, a display screen, and/or speaker(s). The user interface input/output devices may be incorporated with one or more computing system 602 of a user. For example, a mobile phone of the user may include the user interface input output devices; a standalone digital assistant hardware device may include the user interface input/output device; a first computing device may include the user interface input device(s) and a separate computing device may include the user interface output device(s); etc. In some implementations, all or aspects of computing system 602 may be implemented on a computing system that also contains the user interface input/output devices.

Some non-limiting examples of computing system 602 include one or more of: a desktop computing device, a laptop computing device, a standalone hardware device at least in part dedicated to an automated assistant, a tablet computing device, a mobile phone computing device, a computing device of a vehicle (e.g., an in-vehicle communications system, and in-vehicle entertainment system, an in-vehicle navigation system, an in-vehicle navigation system), or a wearable apparatus of the user that includes a computing device (e.g., a watch of the user having a computing device, glasses of the user having a computing device, a virtual or augmented reality computing device). Additional and/or alternative computing systems may be provided. Computing system 602 may include one or more memories for storage of data and software applications, one or more processors for accessing data and executing applications, and other components that facilitate communication over a network. The operations performed by computing system 602 may be distributed across multiple computing devices. For example, computing programs running on one or more computers in one or more locations can be coupled to each other through a network.

In some implementations, speaker separation engine 604 can be used to generate separated audio data by processing audio data which captures an utterance spoken by a human speaker and one or more additional sounds which are not spoken by the human speaker, where the separated audio data isolates the utterance spoken by the human speaker. In some implementations, the speaker separation engine 604 can process the audio data using a speaker separation model 614 and one or more speaker embeddings 626 to generate the separated audio data. In some of those implementations, the speaker separation model 614 can include a voice filter model 402 in accordance with FIG. 4 described herein. The voice filter model 402 can be used to generate a predicted mask, where the separated audio data can be generated by processing the audio data using the predicted mask. In some implementations, the voice filter model can process a speaker embedding for a user and the audio data to generate the predicted mask, such as speaker embedding 106 generated in accordance with FIG. 3 described herein. In some other implementations, the system can process an attended embedding and the audio data using the voice filter model to generate the separated audio data. The attended embedding can be generated based on the speaker embeddings corresponding to multiple users registered with a computing system. In some implementations, the attended embedding can be generated in accordance with FIG. 5 described herein.

TI-SID engine 606 can be used to verify the speaker of an utterance is a registered and/or verified user of the computing system. In some implementations, TI-SID engine 606 can process separated audio data, generated using speaker separation engine 604, and one or more speaker embeddings 626 using TI-SID model 616 to generate speaker verification output. In some implementations, the speaker verification output can indicate whether the speaker of an utterance captured in the audio data is a registered and/or verified user of the computing system.

ASR engine 608 can process audio data to generate a candidate text representation of an utterance captured in the audio data. In some implementations, the ASR engine 608 can process the audio data using ASR model 618 to generate a text representation of a spoken utterance captured in the audio data. Additionally or alternatively, the ASR engine 608 can process separated audio data generated using speaker recognition engine 604 using the ASR model 618 to generate a text representation of an utterance captured in the separated audio data. In some implementations, the ASR model 618 can be stored locally at the computing system 602 and/or can process the audio data locally at the computing system 602. In some implementations, ASR model 618 can be a RNN-T model.

Keyphrase action engine 610 can be used to determine whether at least a portion of a text representation of an utterance (e.g., a text representation of an utterance generated using ASR engine 608) corresponds to a particular keyphrase of a plurality of keyphrases 624 associated with computing system 602. In some implementations, keyphrase action engine 610 can compare the text representation of an utterance with a table of one or more keyphrases 624 corresponding to the user and/or computing system 602. Additionally or alternatively, keyphrase action engine 610 can process the text representation of the utterance using the keyphrase model 620 to generate keyphrase verification output indicating whether the text representation of the utterance corresponds to a keyphrase of the user. In some implementations, the text representation of the utterance is required to exactly match a particular keyphrase. In some other implementations, the text representation of the utterance must be within a threshold distance from a particular keyphrase for it to match.

Additionally or alternatively, keyphrase action engine 610 can determine one or more actions mapped to a particular keyphrase. In some implementations, the system will only determine actions mapped to a particular keyphrase when the human speaker is confirmed to be a verified and/or registered speaker (e.g., the speaker verification output generated using the TI-SID engine 606 indicates a verified and/or registered speaker spoke the utterance), and the text representation of the utterance corresponds to a particular keyphrase. In some implementations, the keyphrase action engine 610 can determine one or more actions mapped to a particular keyphrase. For example, the actions of turning off a first kitchen light, a second kitchen light, and a third kitchen light can be mapped to a particular keyphrase of "turn off the kitchen lights". In some of those implementations, the particular keyphrase can be mapped directly on the computing system to the one or more corresponding actions, thereby enabling bypassing of NLU processing to identify the command, and can lower latency fulfillment and/or reduce the processing power needed to initiate the action(s). In some other implementations, the keyphrase action engine 610 can initiate NLU to identify the command in a particular keyphrase, and can then initiate action(s) corresponding to the identified command.

In some implementations, audio data streams can optionally be processed using the noise cancellation engine 612 to generate the audio data. In some implementations, the audio data streams can be captured using one or more microphones (not depicted). In some implementations, processing audio data streams using an adaptive noise cancellation model 622 to generate audio data is described with respect to FIG. 2 herein.

Figure 7:
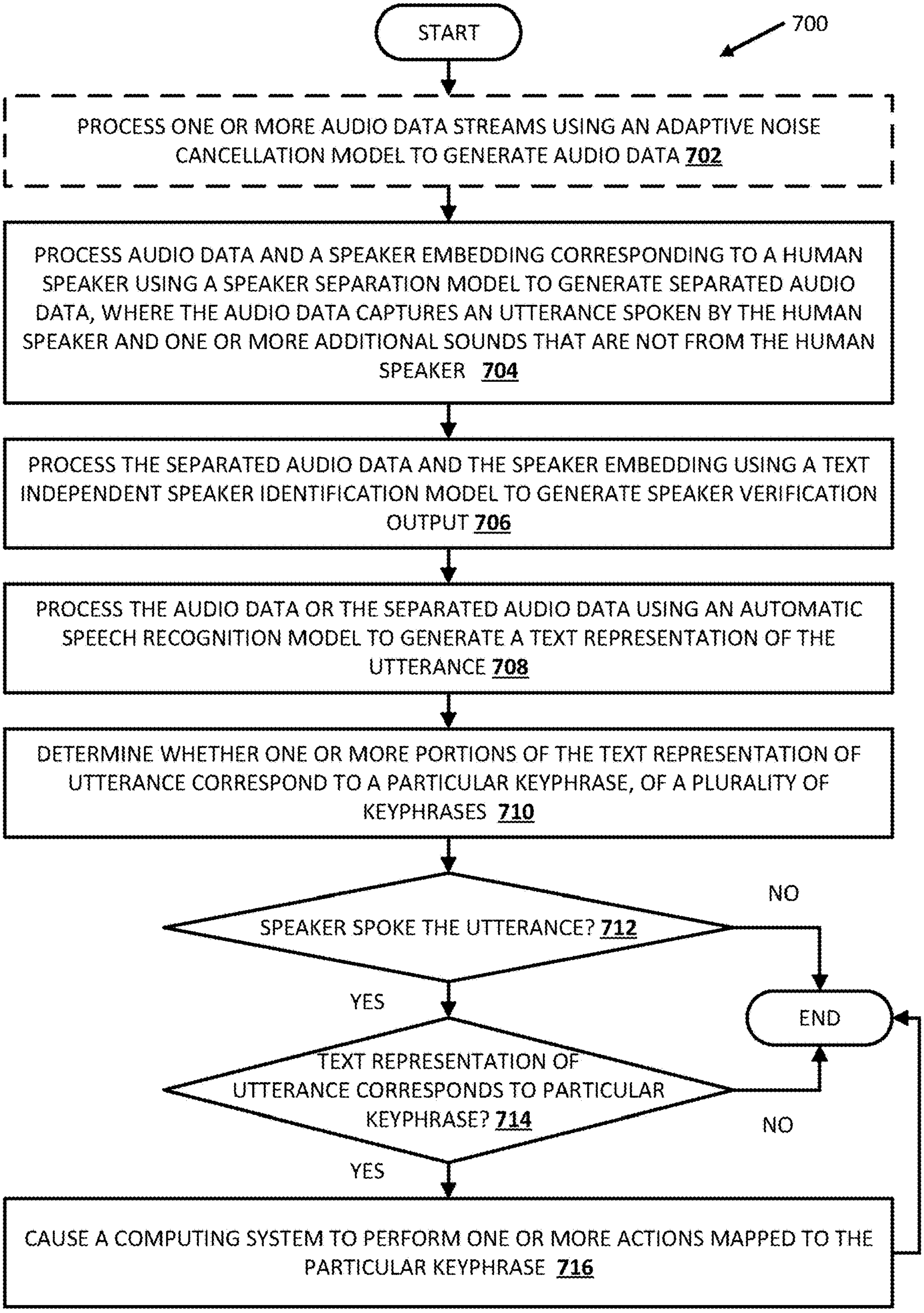
FIG. 7 is a flowchart illustrating an example process of performing action(s) mapped to a particular keyphrase in accordance with various implementations disclosed herein.

FIG. 7 is a flowchart illustrating an example process of 700 of performing action(s) mapped to a particular keyphrase in accordance with various implementations disclosed herein. For convenience, the operations of the flowchart are described with reference to a system that performs the operations. This system may include various components of various computer systems, such as one or more components of computing system 602, client device 802 and/or computing system 910. Moreover, while operations of process 700 are shown in a particular order, this is not meant to be limiting. One or more operations may be reordered, omitted, and/or added.

At block 702, the system optionally processes one or more audio data streams using an adaptive noise cancellation model to generate audio data. In some implementations, processing audio data streams using an adaptive noise cancellation model to generate the audio data is described with respect to FIG. 2 herein.

At block 704, the system processes the audio data and a speaker embedding corresponds to a human speaker, using a speaker separation model, to generate separated audio data. In some implementations, the audio data captures an utterance spoken by the human speaker and one or more additional sounds that are not from the human speaker. The separated audio data isolates the utterance spoken by the human speaker. In other words, the separated audio data captures the utterance and does not capture byte one or more additional sounds that are not from the human speaker. For example, audio data can capture the utterance of "turn on the fan" as well as background noise from a television. The audio data can be processed using a speaker separation model to generate separated audio that includes the spoken utterance of "turn on the fan" but does not include the background noise from the television. In some implementations, the speaker separation model is a voice filter model. In some implementations, the separated audio data can be generated by processing audio data using a voice filter model in accordance with FIG. 4 described herein.

The speaker embedding corresponding to the human speaker can be pre-generated and stored on the system. For example, the speaker embedding can be generated by processing enrollment audio data using a speaker enrollment model. In some implementations, the speaker embedding can be text dependent, where the enrollment audio data captures one or more predefined words and/or phrases. In some other implementations, the speaker embedding can be text independent, where the enrollment audio data can be virtually any word and/or phrase. In some implementations, the speaker embedding corresponding to the human speaker can be generated in accordance with FIG. 3 described herein.

At block 706, the system processes the separated audio data and the speaker embedding using a text independent speaker identification (TI-SID) model to generate speaker verification output. In some implementations, the speaker verification output can provide an indication of whether the user corresponding to the speaker embedding spoke the utterance captured in the separated audio data. In some implementations, the system can process the separated audio data using a TI-SID model to generate speaker verification output in accordance with FIG. 4 described herein.

At block 708, the system processes the audio data and/or the separated audio data using an automatic speech recognition (ASR) model to generate a text representation of the utterance. For example, the system can process the audio data using the ASR model to generate a text representation of the utterance, the system can process the separated audio data using the ASR model to generate the text representation of the utterance, or the system can process the audio data and the separated audio data using the ASR model to generate the text representation of the audio data. In some implementations, the ASR model can be shared with other processes performed using the system. Additionally or alternatively, the ASR model can be a specialized ASR model tailored for streaming keyphrase detection.

At block 710, the system determines whether one or more portions of the text representation of the utterance correspond to a particular keyphrase, of a plurality of keyphrases. In some implementations, the text representation of the utterance can be compared with the text representation of a plurality of keyphrases to determine whether one or more portions of the text representation of the utterance correspond to the particular keyphrase. Additionally or alternatively, the text representation of the utterance can be processed using a keyphrase model to generate output indicating whether one or more portions of the text representation of the utterance correspond to the particular keyphrase.

At block 712, the system determines whether the speaker spoke the utterance. For example, the system can determine whether a registered and/or verified speaker spoke the utterance based on the speaker verification output generated at block 704. If so, the system proceeds to block 714. If not, the process ends.

At block 714, the system determines whether the text representation of the utterance corresponds to the particular keyphrase. For example, the system can determine whether the text representation of the utterance corresponds to a particular keyphrase based on block 710. If so, the system proceeds to block 716. If not, the process ends.

At block 716, the system causes a computing system to perform one or more actions mapped to the particular keyphrase. In some implementations, the system can determine action(s) corresponding to the particular keyphrase by processing the text representation of the utterance by processing the text representation of the utterance using a NLU model to generate an intent of the utterance. The system can identify one or more actions based on the intent. Additionally or alternatively, in some implementations the action(s) corresponding to the utterance can be mapped on the computing system to the particular keyphrase, thus eliminating the need to perform additional NLU processing on the text representation of the utterance.

Figure 8:
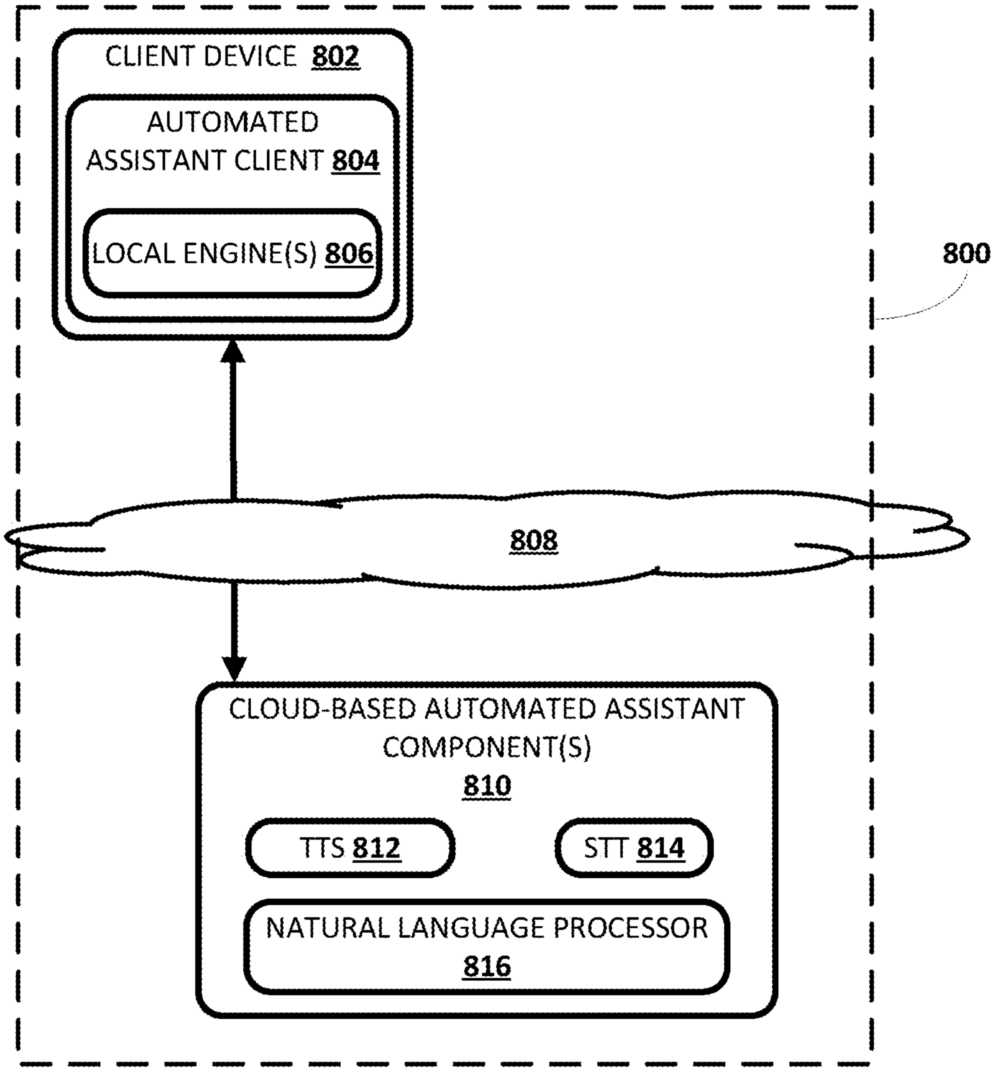
FIG. 8 illustrates a block diagram of another example environment in which implementations disclosed herein may be implemented.

Turning now to FIG. 8, an example environment is illustrated where various implementations can be performed. FIG. 8 is described initially, and includes a client computing device 802, which executes an instance of an automated assistant client 804. One or more cloud-based automated assistant components 810 can be implemented on one or more computing systems (collectively referred to as a "cloud" computing system) that are communicatively coupled to client device 802 via one or more local and/or wide area networks (e.g., the Internet) indicated generally at 808.

An instance of an automated assistant client 804, by way of its interactions with one or more cloud-based automated assistant components 810, may form what appears to be, from the user's perspective, a logical instance of an automated assistant 800 with which the user may engage in a human-to-computer dialog. An instance of such an automated assistant 800 is depicted in FIG. 8. It thus should be understood that in some implementations, a user that engages with an automated assistant client 804 executing on client device 802 may, in effect, engage with his or her own logical instance of an automated assistant 800. For the sakes of brevity and simplicity, the term "automated assistant" as used herein as "serving" a particular user will often refer to the combination of an automated assistant client 804 executing on a client device 802 operated by the user and one or more cloud-based automated assistant components 810 (which may be shared amongst multiple automated assistant clients of multiple client computing devices). It should also be understood that in some implementations, automated assistant 800 may respond to a request from any user regardless of whether the user is actually "served" by that particular instance of automated assistant 800.

The client computing device 802 may be, for example: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided. In various implementations, the client computing device 802 may optionally operate one or more other applications that are in addition to automated assistant client 804, such as a message exchange client (e.g., SMS, MMS, online chat), a browser, and so forth. In some of those various implementations, one or more of the other applications can optionally interface (e.g., via an application programming interface) with the automated assistant 800, or include their own instance of an automated assistant application (that may also interface with the cloud-based automated assistant component(s) 810).

Automated assistant 800 engages in human-to-computer dialog sessions with a user via user interface input and output devices of the client device 802. To preserve user privacy and/or to conserve resources, in many situations a user must often explicitly invoke the automated assistant 800 before the automated assistant will fully process a spoken utterance. The explicit invocation of the automated assistant 800 can occur in response to certain user interface input received at the client device 802. For example, user interface inputs that can invoke the automated assistant 800 via the client device 802 can optionally include actuations of a hardware and/or virtual button of the client device 802. Moreover, the automated assistant client can include one or more local engines 806, such as an invocation engine that is operable to detect the presence of one or more spoken invocation phrases. The invocation engine can invoke the automated assistant 800 in response to detection of one of the spoken invocation phrases. For example, the invocation engine can invoke the automated assistant 800 in response to detecting a spoken invocation phrase such as "Hey Assistant," "OK Assistant", and/or "Assistant". The invocation engine can continuously process (e.g., if not in an "inactive" mode) a stream of audio data frames that are based on output from one or more microphones of the client device 802, to monitor for an occurrence of a spoken invocation phrase. While monitoring for the occurrence of the spoken invocation phrase, the invocation engine discards (e.g., after temporary storage in a buffer) any audio data frames that do not include the spoken invocation phrase. However, when the invocation engine detects an occurrence of a spoken invocation phrase in processed audio data frames, the invocation engine can invoke the automated assistant 800. As used herein, "invoking" the automated assistant 800 can include causing one or more previously inactive functions of the automated assistant 800 to be activated. For example, invoking the automated assistant 800 can include causing one or more local engines 806 and/or cloud-based automated assistant components 810 to further process audio data frames based on which the invocation phrase was detected, and/or one or more following audio data frames (whereas prior to invoking no further processing of audio data frames was occurring). For instance, local and/or cloud-based components can process captured audio data using a two-pass ASR model in response to invocation of the automated assistant 800.

The one or more local engine(s) 806 of automated assistant 800 are optional, and can include, for example, the invocation engine described above, a local voice-to-text ("STT") engine (that converts captured audio to text), a local text-to-speech ("TTS") engine (that converts text to speech), a local natural language processor (that determines semantic meaning of audio and/or text converted from audio), and/or other local components. Because the client device 802 is relatively constrained in terms of computing resources (e.g., processor cycles, memory, battery, etc.), the local engines 806 may have limited functionality relative to any counterparts that are included in cloud-based automated assistant components 810.

Cloud-based automated assistant components 810 leverage the virtually limitless resources of the cloud to perform more robust and/or more accurate processing of audio data, and/or other user interface input, relative to any counterparts of the local engine(s) 806. Again, in various implementations, the client device 802 can provide audio data and/or other data to the cloud-based automated assistant components 810 in response to the invocation engine detecting a spoken invocation phrase, or detecting some other explicit invocation of the automated assistant 800.

The illustrated cloud-based automated assistant components 810 include a cloud-based TTS module 812, a cloud-based STT module 814, a natural language processor 816, a dialog state tracker 818, and a dialog manager 820. In some implementations, one or more of the engines and/or modules of automated assistant 800 may be omitted, combined, and/or implemented in a component that is separate from automated assistant 800. Further, in some implementations automated assistant 800 can include additional and/or alternative engines and/or modules. Cloud-based STT module 814 can convert audio data into text, which may then be provided to natural language processor 816.

Cloud-based TTS module 812 can convert textual data (e.g., natural language responses formulated by automated assistant 800) into computer-generated speech output. In some implementations, TTS module 812 may provide the computer-generated speech output to client device 802 to be output directly, e.g., using one or more speakers. In other implementations, textual data (e.g., natural language responses) generated by automated assistant 800 may be provided to one of the local engine(s) 806, which may then convert the textual data into computer-generated speech that is output locally.

Natural language processor 816 of automated assistant 800 processes free form natural language input and generates, based on the natural language input, annotated output for use by one or more other components of the automated assistant 800. For example, the natural language processor 816 can process natural language free-form input that is textual input that is a conversion, by STT module 814, of audio data provided by a user via client device 802. The generated annotated output may include one or more annotations of the natural language input and optionally one or more (e.g., all) of the terms of the natural language input.

In some implementations, the natural language processor 816 is configured to identify and annotate various types of grammatical information in natural language input. In some implementations, the natural language processor 816 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, the natural language processor 816 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there." In some implementations, one or more components of the natural language processor 816 may rely on annotations from one or more other components of the natural language processor 816. In some implementations, in processing a particular natural language input, one or more components of the natural language processor 816 may use related prior input and/or other related data outside of the particular natural language input to determine one or more annotations.

Figure 9:
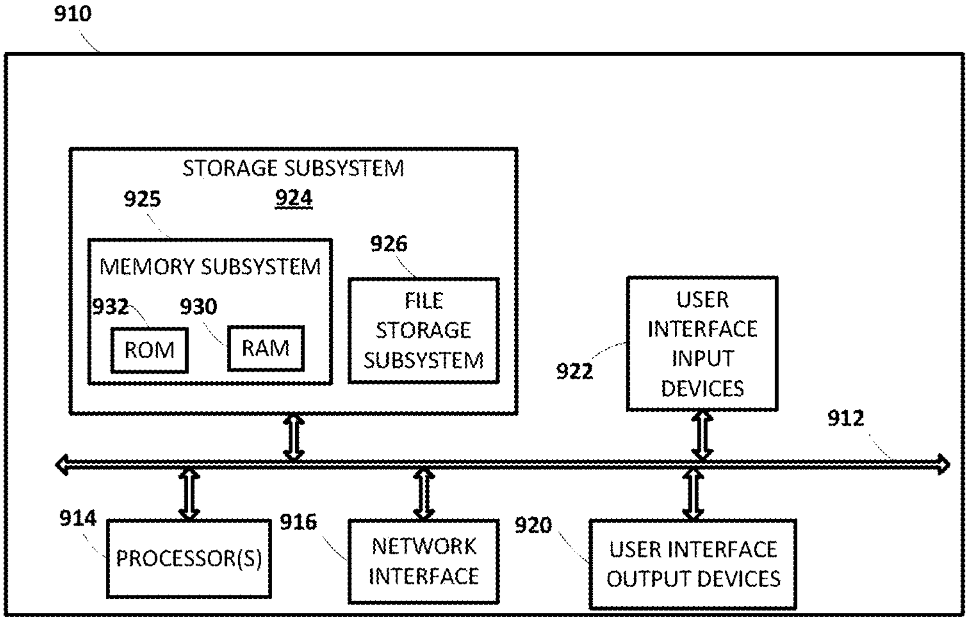
FIG. 9 illustrates an example architecture of a computing device.

FIG. 9 is a block diagram of an example computing device 910 that may optionally be utilized to perform one or more aspects of techniques described herein. In some implementations, one or more of a client computing device, and/or other component(s) may comprise one or more components of the example computing device 910.

Computing device 910 typically includes at least one processor 914 which communicates with a number of peripheral devices via bus subsystem 912. These peripheral devices may include a storage subsystem 924, including, for example, a memory subsystem 925 and a file storage subsystem 926, user interface output devices 920, user interface input devices 922, and a network interface subsystem 916. The input and output devices allow user interaction with computing device 910. Network interface subsystem 916 provides an interface to outside networks and is coupled to corresponding interface devices in other computing devices.

User interface input devices 922 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 910 or onto a communication network.

User interface output devices 920 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 910 to the user or to another machine or computing device.

Storage subsystem 924 stores programming and data constructs that provide the functionality of some or all of the modules described herein. For example, the storage subsystem 924 may include the logic to perform selected aspects of the process of FIG. 7, as well as to implement various components depicted in FIG. 6 and/or FIG. 8.

These software modules are generally executed by processor 914 alone or in combination with other processors. Memory 925 used in the storage subsystem 924 can include a number of memories including a main random access memory ("RAM") 930 for storage of instructions and data during program execution and a read only memory ("ROM") 932 in which fixed instructions are stored. A file storage subsystem 926 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 926 in the storage subsystem 924, or in other machines accessible by the processor(s) 914.

Bus subsystem 912 provides a mechanism for letting the various components and subsystems of computing device 910 communicate with each other as intended. Although bus subsystem 912 is shown schematically as a single bus, alternative implementations of the bus subsystem may use multiple busses.

Computing device 910 can be of varying types including a workstation, server, computing cluster, blade server, server farm, or any other data processing system or computing device. Due to the ever-changing nature of computers and networks, the description of computing device 910 depicted in FIG. 9 is intended only as a specific example for purposes of illustrating some implementations. Many other configurations of computing device 910 are possible having more or fewer components than the computing device depicted in FIG. 9.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, the method including receiving audio data that captures an utterance of a human speaker and that also captures one or more additional sounds that are not from the human speaker. In some implementations, the method includes processing the audio data and a speaker embedding that corresponds to the human speaker, using a speaker separation model, to generate separated audio data which separates the utterance of the human speaker from the one or more additional sounds that are not from the human speaker. In some implementations, the method includes processing the separated audio data and the speaker embedding using a text independent speaker verification model to generate speaker verification output indicating whether the human speaker spoke the utterance. In some implementations, the method includes processing, the audio data or the separated audio data, using an automatic speech recognition ("ASR") model to generate a text representation of the utterance. In some implementations, the method includes determining whether the text representation matches a particular keyphrase, of one or more candidate keyphrases. In some implementations, in response to determining the speaker verification output indicates the human speaker spoke the utterance and determining that the text representation matches the particular keyphrase of the human speaker, the method includes causing a client device to perform one or more actions, that are mapped to the particular keyphrase.

These and other implementations of the technology can include one or more of the following features.

In some implementations, the one or more additional sounds that are not from the human speaker includes one or more background noises, and the method further includes, prior to processing the audio data and the speaker embedding using the speaker separation model to generate the speaker verification output, capturing a first audio data stream using a first microphone, where the first audio data stream captures the utterance of the human speaker and the one or more additional sounds that are not from the human speaker. The method further includes capturing a second audio data stream using a second microphone, where the second audio data stream captures the utterance of the human speaker and the one or more additional sounds that are not from the human speaker. The method further includes processing the first audio data stream and the second audio data stream using an adaptive noise cancellation model to generate the audio data, where the adaptive noise cancellation removes at least one of the one or more background noises from the audio data.

In some implementations, the speaker separation model is a voice filter model, and wherein processing the audio data and the speaker embedding that corresponds to the human speaker, using the voice filter model, to generate the separated audio data includes processing the audio data and the speaker embedding using the voice filter model to generate a predicted mask, wherein the predicted mask isolates one or more portions of the audio data spoken by the human speaker. In some implementations, the method further includes processing the audio data using the predicted mask to generate the separated audio data. In some versions of those implementations, processing the audio data using the predicted mask to generate the separated audio data includes convolving the audio data with the predicted mask to generate the separated audio data.

In some implementations, causing the one or more actions, that are mapped to the particular keyphrase, to be performed includes identifying the one or more actions mapped to the particular keyphrase, wherein the one or more actions mapped to the particular keyphrase corresponding to the human speaker are distinct from one or more additional actions mapped to the particular keyphrase corresponding to an additional human speaker. In some implementations, the method further includes causing the client device to perform the one or more actions.

In some implementations, the voice filter model is a multi-user voice filter model, wherein processing the audio data and the speaker embedding that corresponds to the human speaker, using the voice filter model, to generate the separated audio data includes identifying a plurality of device speaker embeddings, each device speaker embedding corresponding of the plurality of device speaker embeddings corresponding to a distinct registered user associated with the client device, and wherein the plurality of device speaker embeddings includes the speaker embedding corresponding to the human speaker. In some implementations, the method further includes processing the plurality of device speaker embeddings to generate a multi-user speaker embedding. In some implementations, the method further includes generating a predicted mask by processing the audio data and the multi-user speaker embedding using the multi-user voice filter model. In some implementations, the method further includes generating the separated audio data based on the audio data and the predicted mask. In some versions of those implementations, processing the plurality of device speaker embeddings to generate the multi-user speaker embedding includes processing the audio data using a PreNet model to generate a key vector, wherein the key vector is the same dimensionality as the speaker embedding corresponding to the human speaker. In some versions of those implementations, for each device speaker embedding in the plurality of speaker embeddings, the method further includes generating an attended weight based on the key vector and the device speaker embedding. In some versions of those implementations, the method further includes generating the multi-user embedding based on each of the attended weights and the corresponding device speaker embeddings. In some versions of those implementations, the method further includes generating a predicted mask by processing the audio data and the multi-user embedding using the multi-user voice filter model. In some versions of those implementations, the method further includes generating the separated audio data based on the audio data and the predicted mask. In some versions of those implementations, generating the multi-user embedding based on each of the attended weights and the corresponding device speaker embeddings includes, for each device speaker embedding in the plurality of device speaker embeddings, generating a user value by determining a dot product of the attended weight corresponding to the device speaker embedding and the device speaker embedding. In some versions of those implementations, the method further includes generating the multi-user embedding based on each of the user values.

In some implementations, the ASR model is a streaming on-device ASR model, wherein the streaming on-device ASR model is stored locally at the client device, and wherein processing, the audio data or the separated audio data, using the ASR model to generate a text representation of the utterance occurs locally at the client device. In some versions of those implementations, the streaming on-device ASR model is a recurrent neural network transducer ("RNN-T") model.

In some implementations, the particular keyphrase is a personalized keyphrase personalized for the human speaker.

In some implementations, the particular keyphrase is associated with a third party application, and the one or more actions that are mapped to the particular keyphrase include one or more actions for the third party application.

In some implementations, the audio data that captures the utterance of the human speaker and that also captures one or more additional sounds that are not from the human speaker captures an additional utterance spoken by an additional human speaker that is not the human speaker.

In some implementations, the audio data that captures the utterance of the human speaker and that also captures one or more additional sounds that are not from the human speaker captures one or more noises that are not a spoken utterance.

In addition, some implementations include one or more processors (e.g., central processing unit(s) (CPU(s)), graphics processing unit(s) (GPU(s), and/or tensor processing unit(s) (TPU(s)) of one or more computing devices, where the one or more processors are operable to execute instructions stored in associated memory, and where the instructions are configured to cause performance of any of the methods described herein. Some implementations also include one or more transitory or non-transitory computer readable storage media storing computer instructions executable by one or more processors to perform any of the methods described herein.

What is claimed is:

1. A method implemented by one or more processors, the method comprising:

identifying a plurality of device speaker embeddings, each device speaker embedding of the plurality of device speaker embeddings corresponding to a distinct user included in a group of multiple users;

processing the plurality of device speaker embeddings to generate a multi-user speaker embedding that corresponds to the group of multiple users;

receiving audio data that captures an utterance of a given user, included in the group of multiple users, and that also captures one or more additional sounds that are not from the group of multiple users;

processing the audio data and the multi-user speaker embedding, using a multi-user voice filter model, to generate separated audio data which separates the utterance of the given user from the one or more additional sounds that are not from the group of multiple users;

processing the separated audio data using an automatic speech recognition ("ASR") model to generate a text representation of the utterance; and in response to generating the separated audio data and generating the text representation:

causing a client device to perform one or more actions that are based on the text representation.

2. The method of claim 1, further comprising, subsequent to receiving the audio data and subsequent to causing the client device to perform the one or more actions:

receiving additional audio data that captures an additional utterance of an additional user, included in the group of multiple users, and that also captures one or more further sounds that are not from the group of multiple users;

processing the additional audio data and the multi-user speaker embedding, using the multi-user voice filter model, to generate additional separated audio data which separates the additional utterance of the additional user from the one or more further sounds that are not from the group of multiple users;

processing the additional separated audio data using the ASR model to generate an additional text representation of the additional utterance; and in response to generating the additional separated audio data and generating the additional text representation:

causing the client device to perform one or more additional actions that are based on the additional text representation.

3. The method of claim 1, wherein the one or more additional sounds that are not from the group of multiple users include one or more background noises, and further comprising:

prior to processing the audio data and the multi-user speaker embedding using the multi-user voice filter model, capturing a first audio data stream using a first microphone, where the first audio data stream captures the utterance of the given user and the one or more additional sounds that are not from the group of multiple users;

capturing a second audio data stream using a second microphone, where the second audio data stream captures the utterance of the given user and the one or more additional sounds that are not from the group of multiple users;

processing the first audio data stream and the second audio data stream using an adaptive noise cancellation model to generate the audio data, where the adaptive noise cancellation model removes at least one of the one or more background noises from the audio data.

4. The method of claim 1, wherein processing the audio data and the multi-user speaker embedding, using the multi-user voice filter model, to generate the separated audio data comprises:

processing the audio data and the multi-user speaker embedding using the multi-user voice filter model to generate a predicted mask, wherein the predicted mask isolates one or more portions of the audio data; and processing the audio data using the predicted mask to generate the separated audio data.

5. The method of claim 4, wherein processing the audio data using the predicted mask to generate the separated audio data comprises convolving the audio data with the predicted mask to generate the separated audio data.

6. The method of claim 1, wherein processing the plurality of device speaker embeddings to generate the multi-user speaker embedding that corresponds to the group of multiple users comprises concatenating the device speaker embeddings.

7. The method of claim 1, wherein processing the plurality of device speaker embeddings to generate the multi-user speaker embedding comprises:

processing the audio data using a PreNet model to generate a key vector;

for each device speaker embedding in the plurality of device speaker embeddings, generating an attended weight based on the key vector and the device speaker embedding;

generating the multi-user speaker embedding based on each of the attended weights and the corresponding device speaker embeddings.

8. The method of claim 7, wherein generating the multi-user speaker embedding based on each of the attended weights and the corresponding device speaker embeddings comprises:

for each device speaker embedding in the plurality of device speaker embeddings, generating a user value by determining a dot product of the attended weight corresponding to the device speaker embedding and the device speaker embedding; and generating the multi-user speaker embedding based on each of the user values.

9. The method of claim 1, wherein the ASR model is a streaming on-device ASR model, wherein the streaming on-device ASR model is stored locally at the client device, and wherein processing the separated audio data using the ASR model to generate the text representation of the utterance occurs locally at the client device.

10. The method of claim 9, wherein the streaming on-device ASR model is a recurrent neural network transducer ("RNN-T") model.

11. The method of claim 1, wherein the audio data that captures the utterance of the given user and that also captures one or more additional sounds that are not from the group of multiple users captures an additional utterance spoken by an additional human speaker that is not the given user.

12. The method of claim 1, wherein the audio data that captures the utterance of the given user and that also captures one or more additional sounds that are not from the group of multiple users captures one or more noises that are not a spoken utterance.

13. A client device comprising:

one or more microphones;

one or more processors; and memory configured to store instructions that, when executed by one or more of the processors, cause one or more of the processors to:

identify a plurality of device speaker embeddings, each device speaker embedding of the plurality of device speaker embeddings corresponding to a distinct user included in a group of multiple users;

process the plurality of device speaker embeddings to generate a multi-user speaker embedding that corresponds to the group of multiple users;

receive, via the one or more microphones, audio data that captures an utterance of a given user, included in the group of multiple users, and that also captures one or more additional sounds that are not from the group of multiple users;

process the audio data and the multi-user speaker embedding, using a multi-user voice filter model, to generate separated audio data which separates the utterance of the given user from the one or more additional sounds that are not from the group of multiple users;

process the separated audio data using an automatic speech recognition ("ASR") model to generate a text representation of the utterance; and in response to generating the separated audio data and generating the text representation:

cause the client device to perform one or more actions that are based on the text representation.

14. The client device of claim 13, wherein the instructions, when executed by one or more of the processors, further cause one or more of the processors to:

subsequent to receiving the audio data and subsequent to causing the client device to perform the one or more actions:

receive additional audio data that captures an additional utterance of an additional user, included in the group of multiple users, and that also captures one or more further sounds that are not from the group of multiple users;

process the additional audio data and the multi-user speaker embedding, using the multi-user voice filter model, to generate additional separated audio data which separates the additional utterance of the additional user from the one or more further sounds that are not from the group of multiple users;

process the additional separated audio data using the ASR model to generate an additional text representation of the additional utterance; and in response to generating the additional separated audio data and generating the additional text representation:

cause the client device to perform one or more additional actions that are based on the additional text representation.

15. The client device of claim 13, wherein the one or more additional sounds that are not from the group of multiple users include one or more background noises, and wherein the instructions, when executed by one or more of the processors, further cause one or more of the processors to:

prior to processing the audio data and the multi-user speaker embedding using the multi-user voice filter model:

capture a first audio data stream using a first microphone of the microphones, where the first audio data stream captures the utterance of the given user and the one or more additional sounds that are not from the group of multiple users;

capture a second audio data stream using a second microphone of the microphones, where the second audio data stream captures the utterance of the given user and the one or more additional sounds that are not from the group of multiple users;

process the first audio data stream and the second audio data stream using an adaptive noise cancellation model to generate the audio data, where the adaptive noise cancellation model removes at least one of the one or more background noises from the audio data.

16. The client device of claim 13, wherein in processing the audio data and the multi-user speaker embedding, using the multi-user voice filter model, to generate the separated audio data, one or more of the processors are to:

process the audio data and the multi-user speaker embedding using the multi-user voice filter model to generate a predicted mask, wherein the predicted mask isolates one or more portions of the audio data; and process the audio data using the predicted mask to generate the separated audio data.

17. The client device of claim 16, wherein in processing the audio data using the predicted mask to generate the separated audio data one or more of the processors are to convolve the audio data with the predicted mask to generate the separated audio data.

18. The client device of claim 13, wherein in processing the plurality of device speaker embeddings to generate the multi-user speaker embedding that corresponds to the group of multiple users one or more of the processors are to concatenate the device speaker embeddings.

19. The client device of claim 13, wherein in processing the plurality of device speaker embeddings to generate the multi-user speaker embedding one or more of the processors are to:

process the audio data using a PreNet model to generate a key vector;

for each device speaker embedding in the plurality of device speaker embeddings, generate an attended weight based on the key vector and the device speaker embedding;

generate the multi-user speaker embedding based on each of the attended weights and the corresponding device speaker embeddings.

20. The client device of claim 19, wherein in generating the multi-user speaker embedding based on each of the attended weights and the corresponding device speaker embeddings one or more of the processors are to:

for each device speaker embedding in the plurality of device speaker embeddings, generate a user value by determining a dot product of the attended weight corresponding to the device speaker embedding and the device speaker embedding; and generate the multi-user speaker embedding based on each of the user values.

* * * * *